United States Patent
Kondo et al.

(10) Patent No.: US 6,919,055 B2
(45) Date of Patent: Jul. 19, 2005

(54) HYDROGEN SUPPLY DEVICE

(75) Inventors: Yasuo Kondo, Okazaki (JP); Tadayoshi Terao, Toyoake (JP); Kiyoshi Kawaguchi, Toyota (JP)

(73) Assignee: Denso Corporation, Kariya (JP)

( * ) Notice: Subject to any disclaimer, the term of this patent is extended or adjusted under 35 U.S.C. 154(b) by 395 days.

(21) Appl. No.: 09/942,122

(22) Filed: Aug. 30, 2001

(65) Prior Publication Data

US 2002/0062943 A1 May 30, 2002

(30) Foreign Application Priority Data

| Aug. 30, 2000 | (JP) | 2000-261092 |
| Oct. 6, 2000 | (JP) | 2000-308033 |
| Nov. 10, 2000 | (JP) | 2000-343666 |
| Apr. 26, 2001 | (JP) | 2001-130121 |

(51) Int. Cl.$^7$ .................. F23L 15/00; F28D 11/02; B01J 8/00
(52) U.S. Cl. ............... 422/209; 422/190; 422/198; 48/127.9; 165/8; 165/DIG. 16
(58) Field of Search ............... 422/188–190, 422/198, 200, 201, 204, 206, 209, 211, 215, 202, 224; 48/127.9, 198.1, 198.3, 198.7, 211, 212, 214 R, 215, 214 A; 423/657, 658, 658.2; 165/6, 8, 9, 86, 88, 109.1, 120, 138, 186, 902, DIG. 16, DIG. 18, DIG. 28, DIG. 29, DIG. 135, DIG. 152

(56) References Cited

U.S. PATENT DOCUMENTS

| 3,211,148 A | * | 10/1965 | Galajda, Jr. | 422/46 |
| 4,025,612 A | * | 5/1977 | Barber | 423/655 |
| 4,562,053 A | * | 12/1985 | Andersson | 423/235 |
| 4,678,643 A | * | 7/1987 | Fetzer | 422/175 |
| 5,145,011 A | * | 9/1992 | Seike et al. | 165/9 |
| 5,234,048 A | * | 8/1993 | Seike et al. | 165/9 |
| 5,323,842 A | * | 6/1994 | Spokoyny et al. | 165/7 |
| 5,397,548 A | * | 3/1995 | Kritzler et al. | 422/173 |
| 6,013,385 A | * | 1/2000 | DuBose | 429/17 |
| 6,565,999 B1 | * | 5/2003 | Haogland | 429/26 |

FOREIGN PATENT DOCUMENTS

| JP | 62258994 A | * | 11/1987 |
| JP | 62261895 A | * | 11/1987 |
| JP | 63044931 | | 2/1988 |
| JP | 2160601 | | 6/1990 |
| JP | 11343101 | | 12/1999 |
| JP | 2000191304 | | 7/2000 |

* cited by examiner

Primary Examiner—Kiley S. Stoner
Assistant Examiner—Kevin McHenry
(74) Attorney, Agent, or Firm—Harness, Dickey & Pierce, PLC

(57) ABSTRACT

In the hydrogen supply device for producing and supplying hydrogen to a fuel cell, a heat exchange section has a rotary thermal storage through which low and high temperature passages pass. Reforming material is supplied to the low temperature fluid passage on an upstream side of the heat exchange section. A reforming section for producing reformed gas containing hydrogen is located at a downstream side of the low temperature fluid passage. A combustion gas supply section for generating and supplying a combustion gas is located in the high temperature fluid passage. The rotary thermal storage rotates to move alternately between the low and high temperature fluid passages so that heat of the combustion gas flowing in the high temperature fluid conduit is transferred to reforming material flowing in the low temperature fluid conduit. The low temperature fluid passage communicates with the high temperature fluid passage via the fuel cell.

30 Claims, 24 Drawing Sheets

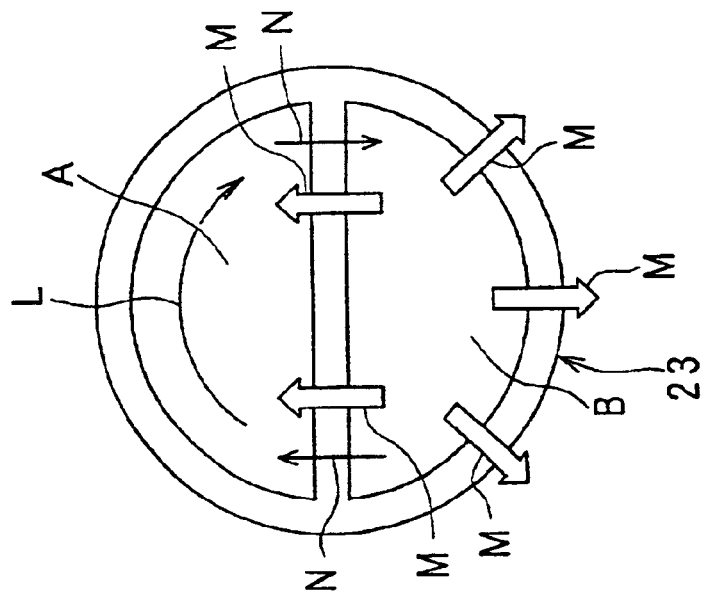
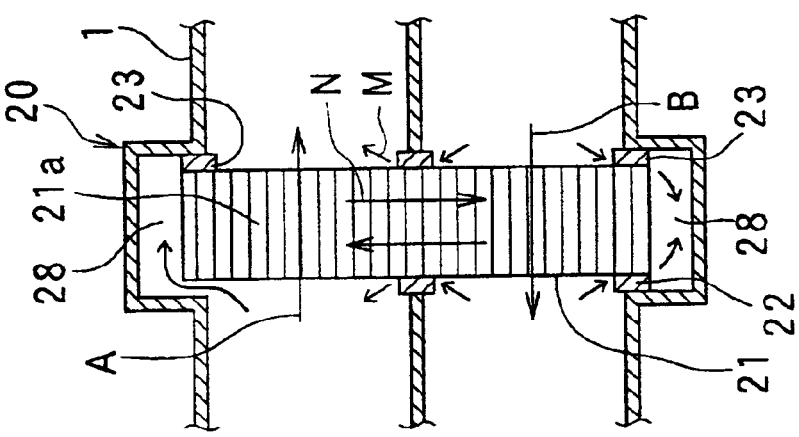
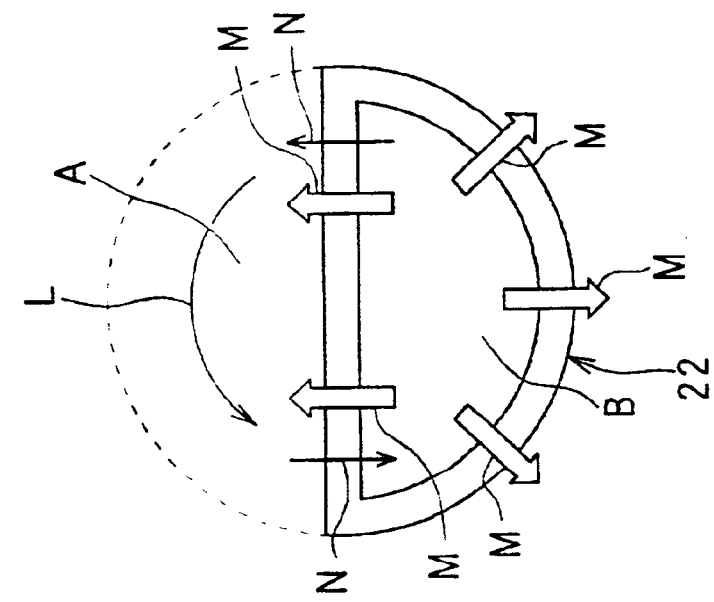

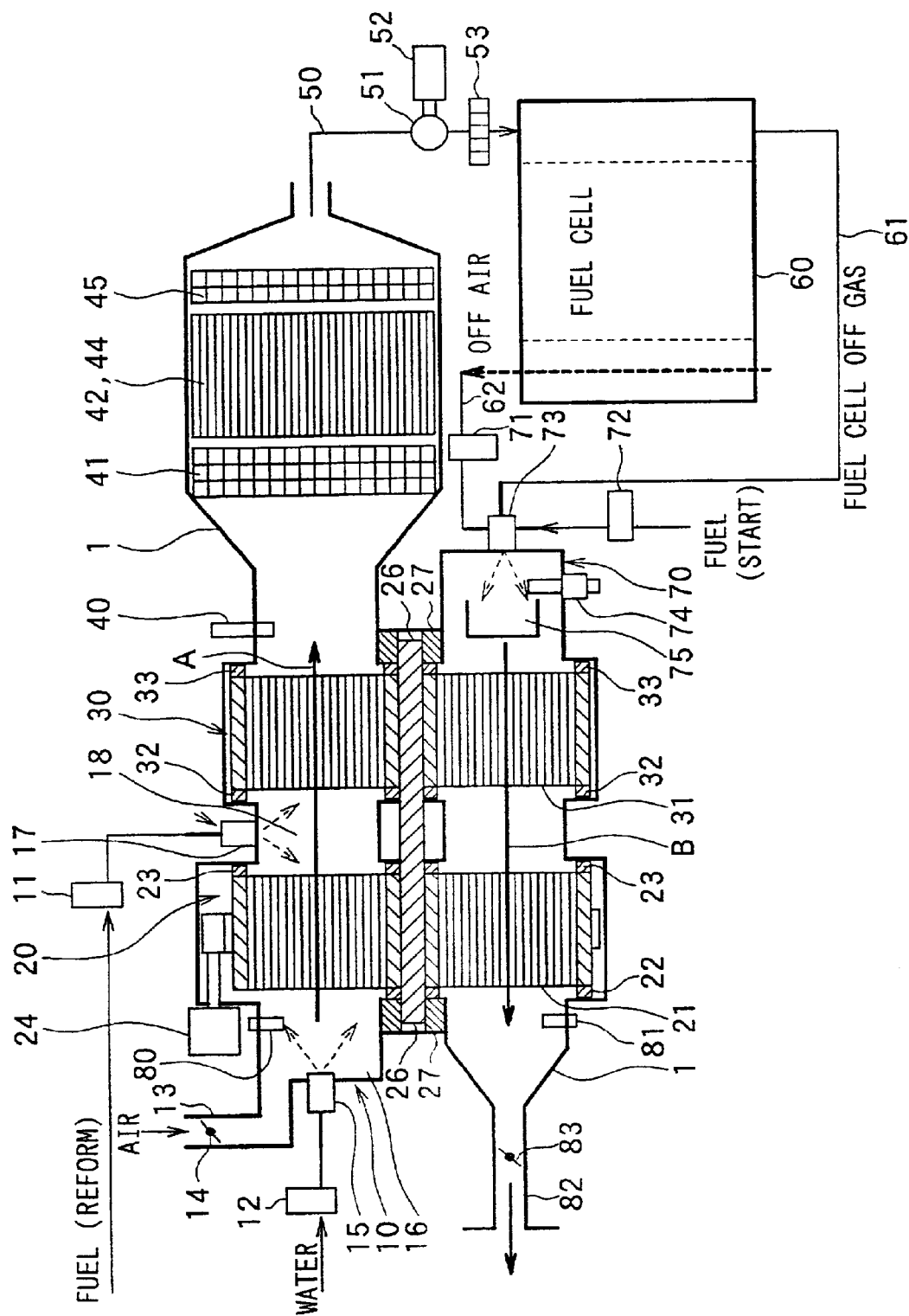

HYDROGEN SUPPLY DEVICE

CROSS REFERENCE TO RELATED APPLICATION

This application is based upon and claims the benefit of priority of Japanese Patent Applications No. 2000-261092 filed on Aug. 30, 2000, No. 2000-308033 filed on Oct. 6, 2000, No. 2000-343666 filed on Nov. 10, 2000 and No. 2001-130121 filed on Apr. 26, 2001, the contents of which are incorporated herein by reference.

BACKGROUND OF THE INVENTION

1. Field of the Invention

The present invention relates to a hydrogen supply device for producing hydrogen due to a reforming reaction of reforming material and supplying the produced hydrogen to a hydrogen consumption device.

2. Description of Related Art

Conventionally, a hydrogen supply device disclosed in JP-A-11-343101 is known. The conventional hydrogen supply device has a structure that off gas of a fuel cell is combusted in a combustion section for transferring the combustion heat of the combustion gas to reforming material. However, pre-heating and evaporation sections, through which the reforming material passes and in which the reforming material is pre-heated and evaporated by the combustion heat transmitted from the combustion section before being supplied to the reforming section, are located at positions far away from a downstream side of the combustion section.

The conventional hydrogen supply device having the structure mentioned above has a drawback that the heat transmitted to the pre-heating and evaporation sections from the combustion section is indirectly transferred to the reforming material, resulting in insufficient heat transfer to the reforming material, and, further, the heat transfer to the reforming material is not effective since the pre-heating and evaporation sections are located far away from the combustion section.

Further, at a time of actuation of the conventional hydrogen supply device, unreacted combustion gas containing harmful components due to incomplete combustion is likely to be exhausted to the outside.

Furthermore, to perform both of a steam vapor reforming (an endothermic reaction) and a partial oxidization reforming (an exothermic reaction) in a reforming section, reforming material containing fuel, water and air, which has been heated and vaporized by a heat exchanger (evaporator), is supplied to the reforming section so that carbonized components produced in a reaction of fuel with oxygen in air is deposited in the heat exchanger, resulting in narrowing and blocking a reforming material flow path of the heat exchanger. In particular, when liquid petroleum fuel is used as the reforming material, the deposition in the heat exchanger is distinctive.

SUMMARY OF THE INVENTION

In view of the above-described problem, it is an object of the present invention to provide a hydrogen supply device in which heat of combustion gas is directly transferred to reforming material so that a distance for transmitting heat from the combustion gas to the reforming material is minimized.

To accomplish the above-described object, in the hydrogen supply device for producing and supplying hydrogen to a hydrogen consumption device, a heat exchange section has a rotary thermal storage through which low and high temperature passages pass. The rotary thermal storage has a rotating shaft about which the rotary thermal storage is driven to rotate. Reforming material is supplied to the low temperature fluid passage on an upstream side of the heat exchange section. A reforming section for producing reformed gas containing hydrogen is located at a downstream side of the low temperature fluid passage. A combustion gas supply section for generating and supplying a combustion gas is located in the high temperature fluid passage.

With the hydrogen supply device mentioned above, the rotary thermal storage rotates to move alternately between the low and high temperature fluid passages so that combustion heat of the combustion gas flowing in the high temperature fluid conduit is transferred to the reforming material flowing in the low temperature fluid conduit.

Fluid leakage tends to occur from a clearance between the rotary thermal storage and gas seals in slidable contact with the rotary thermal storage in a direction from the low temperature fluid passage to the high temperature fluid passage. Therefore, it is preferable that pressurizing means such as a gas compressor is provided for increasing pressure of the combustion gas flowing in the high temperature fluid passage.

Preferably, the gas compressor is located in a reformed gas supply path communicating between the reforming section and the hydrogen consumption device such as a fuel cell so that the pressure of the high temperature fluid passage is isobaric to or higher than the pressure of the low temperature fluid passage, resulting in preventing the fluid leakage from the clearance between the rotary thermal storage and the gas seals.

Further, it is preferable that pressure adjusting means, for example, a pressure control valve operative to alter a fluid flow passage area, are located at the low temperature fluid passage on an upstream side of the heat exchange section and/or at the high temperature fluid passage on a downstream side of the heat exchange section. ECU controls the operation of the pressure adjusting means upon receipt of signals of the pressure detecting sensors located in the low and/or high temperature fluid passages in a vicinity of the rotary thermal storage so that a pressure difference between the low and high temperature fluid conduits is easily adjusted.

Moreover, it is preferable that the reforming material is supplied from two different supply sections. One is a first reforming material supply section in which a first reforming material containing at least water (and air) is supplied to the low temperature fluid passage on an upstream side of the heat exchange section. The other one is a second reforming material supply section in which second reforming material (fuel) containing at least hydride compounds is supplied to the low temperature fluid passage on a downstream side of the heat exchange section and mixed with the first reforming material to form the reforming material. With this construction, the deposition of the reforming material on walls of the rotary thermal storage and the blockage of through-holes of the rotary thermal storage can be prevented.

Furthermore, it is preferable that off gas containing unreacted hydrogen not consumed in the hydrogen consumption device is supplied from the hydrogen consumption device to the combustion gas supply section for producing the combustion gas.

At a time of actuation of the hydrogen supply device, igniting means provided in the combustion gas supply section serves to ignite fuel and initiate flame combustion for heating up more rapidly the rotary thermal storage and the reforming section. The igniting means may be disposed in an actuation combustion chamber of the low temperature fluid passage on an upstream side of the heat exchange section or between the heat exchange section and the reforming section for igniting the reformed material and initiating the flame combustion.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings.

FIGS. 7A to 7C are another enlarged cross sectional views illustrating sealing conditions of the rotary thermal storage by the gas seals;

FIG. 8 is a conceptual diagram illustrating an arrangement of components of a hydrogen supply device according to second embodiment of the present invention;

DETAILED DESCRIPTION OF PREFERRED EMBODIMENT (First Embodiment)

Figure 1:
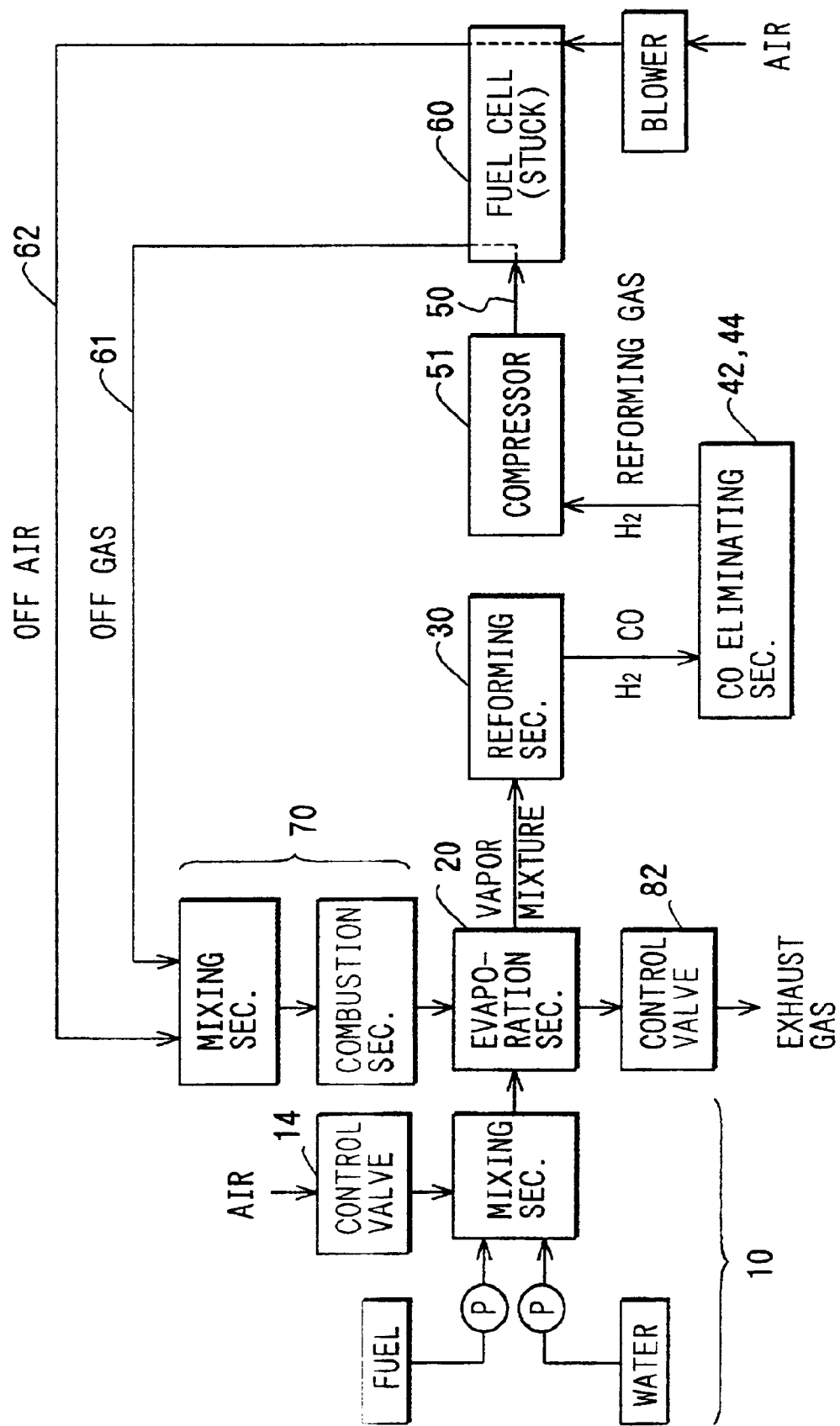
FIG. 1 is a block diagram illustrating a general structure of a hydrogen supply device according to first embodiment of the present invention.
Figure 2:
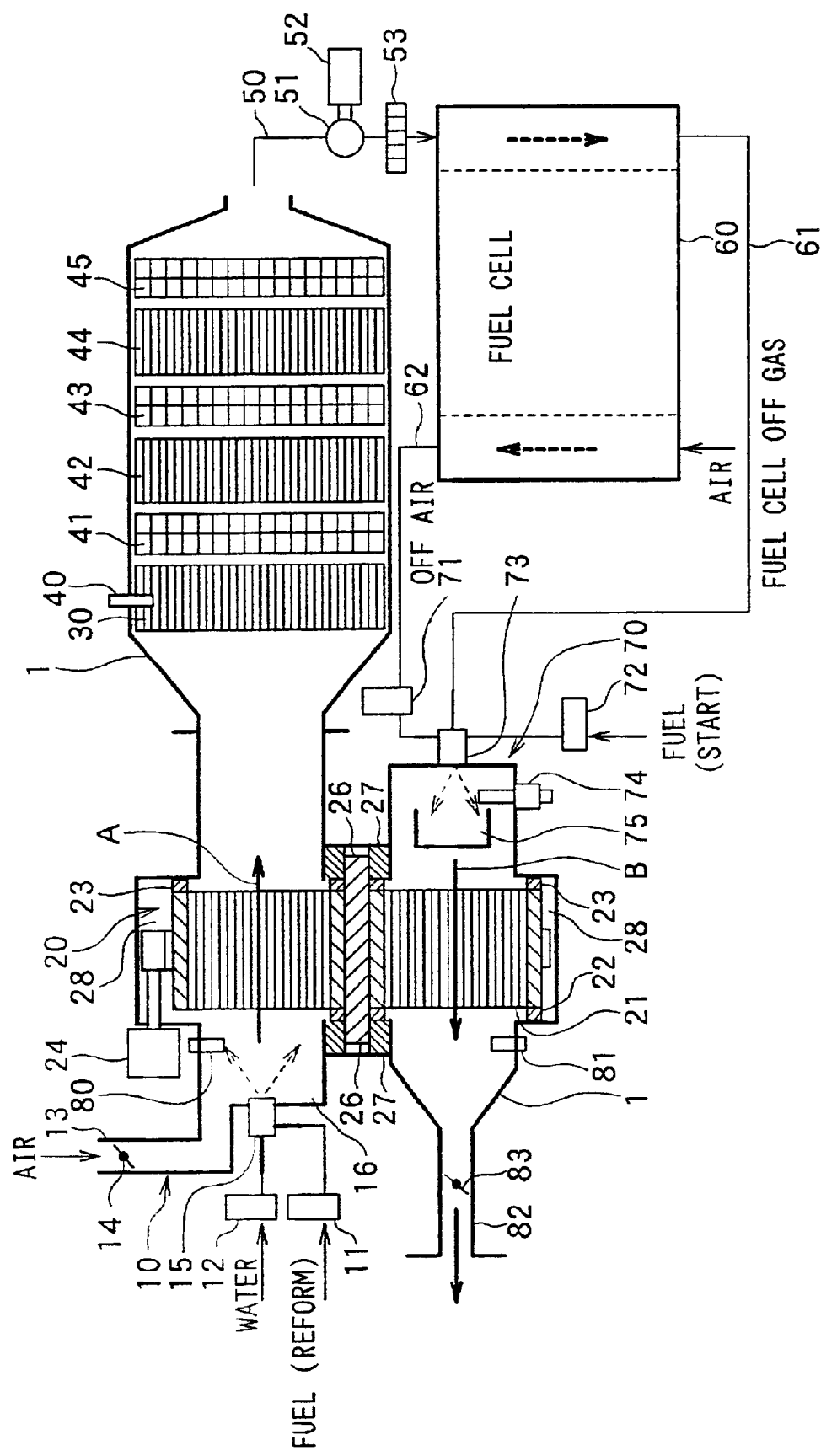
FIG. 2 is a conceptual diagram illustrating an arrangement of components of the hydrogen supply device of FIG. 1.

Referring to FIGS. 1 to 6C, first embodiment of the present invention will be described. FIG. 1 is a block diagram illustrating a general structure of a hydrogen supply device according to first embodiment. FIG. 2 is a conceptual diagram illustrating an arrangement of components of the hydrogen supply device. The hydrogen supply device according to first embodiment supplies hydrogen to a fuel cell 60, which functions as a hydrogen consumption device.

As shown in FIGS. 1 and 2, the hydrogen supply device according to first embodiment includes a reforming material supply section 10, a heat exchange section (evaporation section) 20, a reforming section 30, a CO eliminating sections 42 and 44, a gas compressor (pressurizing means) 51, and a combustion gas supply section (off gas supply section) 70. Moreover, in the hydrogen supply device, a housing 1 forms a low temperature fluid passage (a reforming material passage) A for passing the reforming material and a high temperature fluid passage (a combustion gas passage) B for passing the combustion gas. The low temperature fluid passage A and the high temperature fluid passage B are parallel to each other. The low temperature fluid passage A and the high temperature fluid passage B are independent from each other, and the heat is exchanged through the heat exchange section 20.

In the low temperature fluid passage A, the reforming material (a mixture of water, the air and synthetic fuel) supplied from the reforming material supply section 10 is heated and evaporated (vaporized) at the heat exchange section 20. The evaporated reforming material is reformed at the reforming section 30 to a reformed gas containing $H_2$ and CO. After CO is eliminated at the CO eliminating sections 42 and 44, it is supplied as a hydrogen rich gas by the gas compressor 51 to the fuel cell 60.

To the fuel cell 60, the air (oxygen) is supplied along with hydrogen by an air supply pump (not shown), so that power is generated due to an electrochemical reaction of hydrogen and oxygen. In the fuel cell 60, off gas containing unreacted hydrogen that has not been used for power generation is emitted.

In the high temperature fluid passage B, the off gas is supplied to the combustion gas supply section 70 through an off gas supply section 61 so that the off gas is combusted to become the combustion gas. The combustion heat of the combustion gas flowing in the high temperature fluid passage B is transferred via the heat exchange section 20 to the reforming material flowing in the low temperature fluid passage A. In the present embodiment, liquid petroleum fuel such as gasoline and kerosene are used as the reforming fuel (as one of reforming material).

As shown in FIG. 2, a reforming material supply section 10 for supplying the reforming materials (water, air and the reforming fuel) is placed at an upper-most stream part of the low temperature fluid passage A. The reforming material supply section 10 includes a fuel flow rate control valve 11, a water flow rate control valve 12, an air supply passage 13, a spray nozzle 15, and a mixing chamber 16. In the air supply passage 13, there is provided an inlet control valve (pressure adjustment means) 14, which can change the passage area of the air supply passage 13.

The reforming fuel and water whose flow rates are controlled by the fuel flow rate control valve 11 and the water flow rate control valve 12, respectively, are sprayed from the spray nozzle 15 into the mixing chamber 16 so as to be mixed with the air supplied from the air supply passage 13, thus producing a fuel-air mixture of the fuel, water, and air. The gas compressor 51, which will be described later, draws the air to supply to the mixing chamber 16.

On a downstream side of a first reforming material supply section 10 in the low temperature fluid passage A, the heat exchange section (evaporation section) 20 is disposed. The heat exchange section 20 according to first embodiment is a rotary type heat exchanger.

Figure 3:
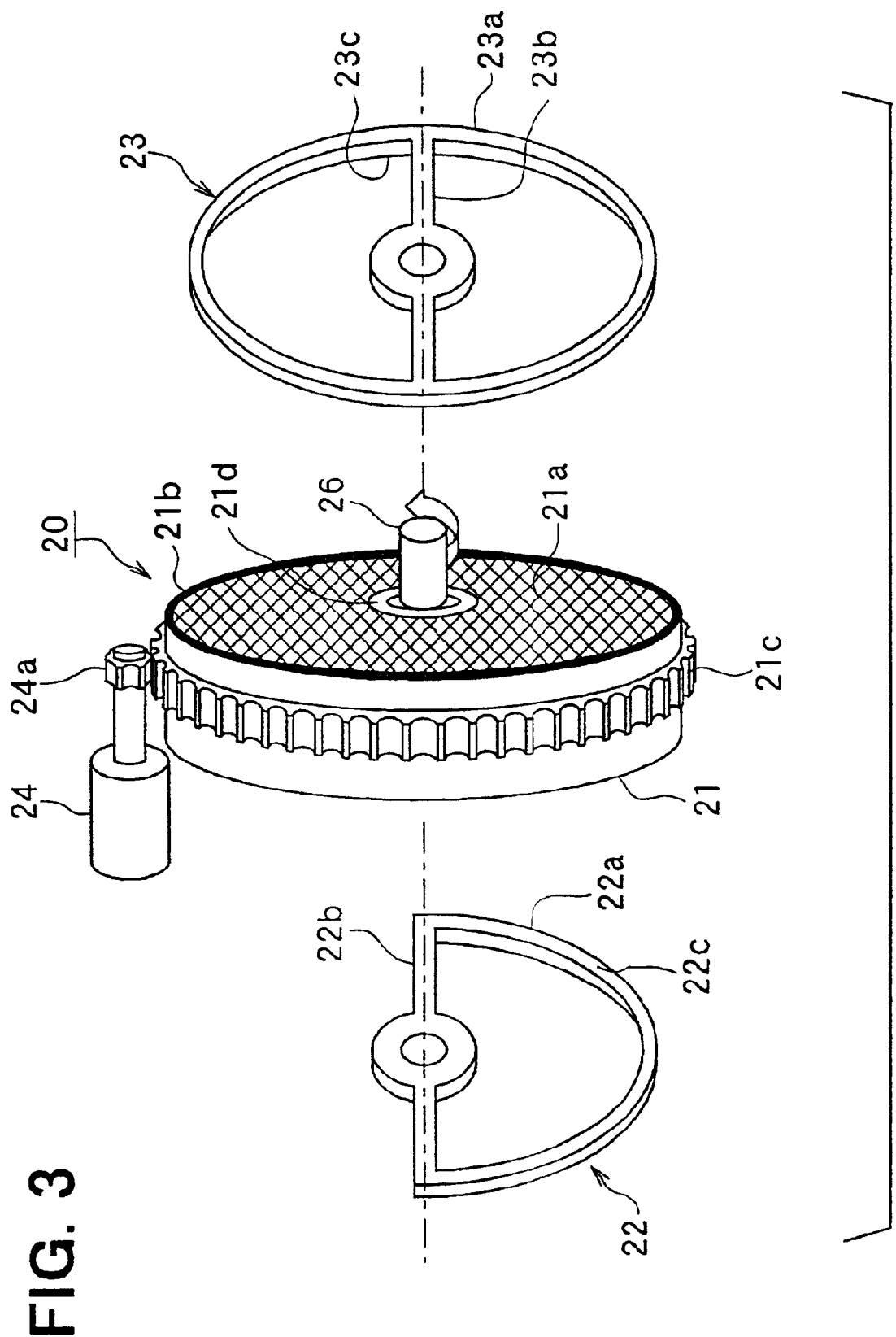
FIG. 3 is an exploded perspective view of the heat exchange section of FIG. 2.

FIG. 3 is an exploded perspective view of the heat exchange section (evaporation section) 20. As shown in FIG. 3, the heat exchange section 20 includes a rotary thermal storage (matrix) 21 for storing thermal energy, a pair of rest gas seals 22 and 23 for preventing gas leakage by tightly sliding along the matrix 21, and a driving motor 24 for rotary driving the matrix 21.

The matrix 21 is formed in a disk shape and of a heat resistance ceramic such as cordierite. The matrix 21 has a honeycomb structure having many through holes (cells) 21a along an axial direction formed therein. A peripheral surface section 21b, which is in contact with gas seals 22 and 23 of the matrix 21, is either coated with a cement or firmly fixed by a solid ceramic ring so as to form a sealing surface.

Figure 4A:
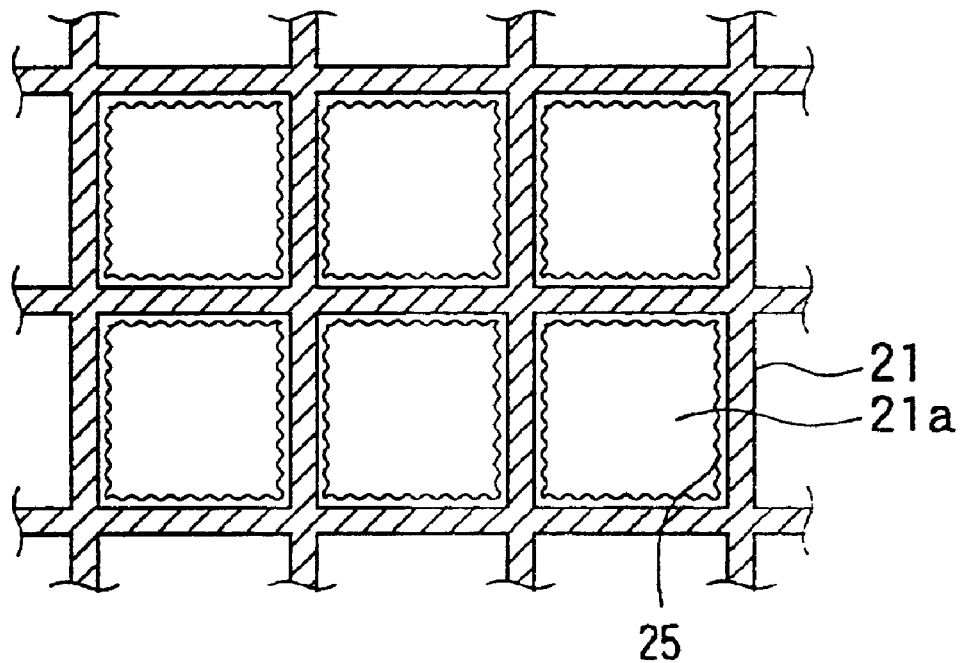
FIG. 4A is a diagram illustrating an example of a rectangular cell configuration composing the rotary thermal storage of FIG. 2.
Figure 4B:
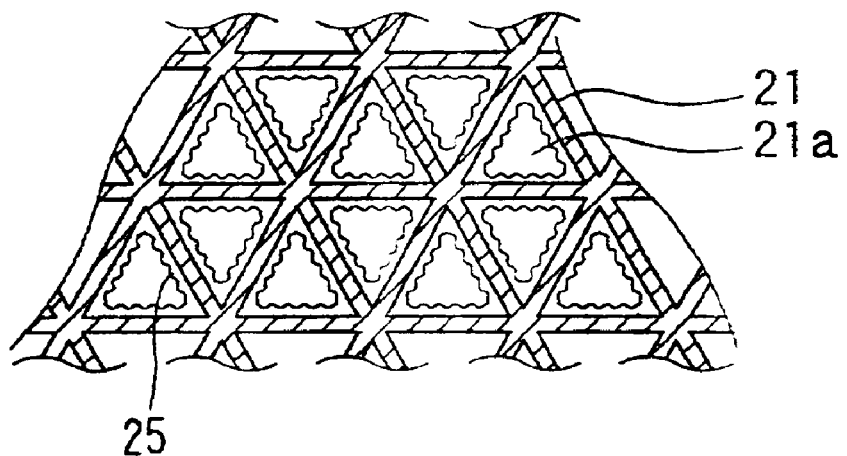
FIG. 4B is a diagram illustrating another example of a triangular cell configuration composing the rotary thermal storage of FIG. 2.

FIGS. 4A and 4B are diagrams illustrating examples of cell configurations composing the rotary thermal storage 21, in which FIG. 4A is a rectangular cell, and FIG. 4B is a triangular cell. An oxidation catalyst (such as platinum, palladium, or a mixture thereof) 25 is attached to (or supported on) each surface of the cell. Thereby, the off gas of the fuel cell 60 supplied to the high temperature fluid passage B can be catalytically combusted.

A rotating shaft 26 and a bearing 27 provided on the housing 1 side supports the matrix 21. The rotating shaft 26 is fixed on a solid hub 21d provided at the center of the matrix 21. The matrix 21 is rotary driven by a power motor 24. On a peripheral surface of the matrix, a ring gear 21c is provided. The rotary force from the power motor 24 is transferred to the ring gear 21c through a pinion 24a that is fixed on the rotating shaft of the power motor 24. Because the bearing 27 as a sliding member is used in a high temperature atmosphere, it is formed of a high-temperature nonluburicant material (such as a hard carbon materials).

The gas seals 22 and 23 are formed of a ceramic or a heat resistance metal such as stainless steal, for example. The first gas seal 22 is positioned on the upstream side of the low temperature fluid passage A and the downstream side of the high temperature fluid passage B, and formed in such a manner that a semicylinder flange 22a and a cross arm 22b passing through the center thereof in a direction of a diameter are integrated to form a D-shape. On the other hand, the second gas seal 23 is positioned on the downstream side of the low temperature fluid passage A and the upstream side of the high temperature fluid passage B, and formed in such a manner that a cylinder flange 23a and a cross arm 23b passing through the center thereof in a direction of a diameter are integrated to form a θ-shape.

Sliding surfaces of the cross arms 22b and 23b and sealing surfaces of the gas seals 22c and 23c, which are in contact with the peripheral surface 21b of the matrix 21, are formed by coating or the like of a high-temperature nonlubricant material layer (not shown) having a low coefficient of friction in order to reduce friction of the matrix 21 and the gas seals 22 and 23.

In order to prevent a high pressured reforming material flowing in the low temperature fluid passage A from leaking into the high temperature fluid passage B, the gas seals 22 and 23 lie between the matrix 21 and the housing 1 for sealing. The gas seals 22 and 23 are fixed onto the housing 1 while the sealing surfaces 22c and 23c are interposing the matrix 21 from both sides along the axial direction. The matrix 21 is divided into two areas by the cross arms 22b and 23b of the gas seals 22 and 23, respectively.

As shown in FIG. 2, the matrix 21 is placed so as to cross over both of the low temperature fluid passage A and the high temperature fluid passage B, which are disposed parallel to each other. At that time, one area that is divided by the cross arms 22b and 23b of the gas seals 22 and 23, respectively, is positioned in the low temperature fluid passage A, while another area is positioned in the high temperature fluid passage B. The matrix 21 makes sliding-rotation movement between the gas seals 22 and 23, and alternatively moves between the low temperature fluid passage A (where the reforming material passes through) and the high temperature fluid passage B (where the off gas (combustion gas) passes though). In the high temperature fluid passage B, the matrix 21 receives the heat from the combustion gas passing through the through holes 21a, and then moves to the low temperature fluid passage A to transfer the heat to the reforming material passing through the through holes 21a so as to heat and evaporate the material.

At that time, by controlling rotating speed of the matrix 21, a heat transfer rate from the high temperature fluid passage B to the low temperature fluid passage A can be adjusted. Specifically, by increasing the rotation speed of the matrix 21, the heat transfer rate can be increased. Likewise, by decreasing the rotation speed, the heat transfer rate can be decreased.

Moreover, because the first gas seal 22 has the D-shape structure, the upstream side of the rotary thermal storage 21 in the low temperature fluid passage A is not sealed. Thus, in the low temperature fluid passage A, the low-temperature reforming material before heating enters into a space 28 between the housing 1 and the rotary thermal storage 21. Therefore, it is possible to cool the ring gear 21a of the rotary thermal storage 21 and the pinion 24a of the power motor 24, both of which become hot.

The second gas seal 23 has the θ-shape structure, the downstream side of the rotary thermal storage 21 in the low temperature fluid passage A is sealed. Accordingly, the reforming material entered into the space 28 between the housing 1 and the rotary thermal storage 21 in the low temperature fluid passage A is prevented from short-passing the rotary thermal storage 21, thus enabling to securely pass the reforming material through the rotary thermal storage 21.

On the downstream side of the heat exchange section 20, the reforming section 30 is provided. In the reforming section 30 according to first embodiment, a partial oxidization reforming (an exothermic reaction) is used in conjunction with a steam vapor reforming (an endothermic reaction). A reforming catalyst (an element of nickel oxide, copper oxide, platinum, palladium or the like, or a mixture thereof) is attached on the reforming section 30. In the reforming section 30, the evaporated reforming material after heated in the heat exchange section 20 is reformed to generate a reformed gas containing $H_2$ and CO. The reforming section 30 also includes a temperature sensor (temperature detection means) 40 for detecting a temperature of the reforming catalyst.

On the downstream side of the reforming section 30, the CO eliminating sections 42 and 44 for eliminating CO from the reformed gas is provided. The CO eliminating sections 42 and 44 are a CO shifting section 42 and a CO purifying section 44. A shift catalyst is provided in the CO shifting section 42 for a CO shift reaction ($H_2O+CO \rightarrow CO_2+H_2$), and, for removing unreacted CO in the CO shift reaction, a purifying catalyst is provided in the CO purifying section 44 for a CO purifying reaction ($CO+1/2O_2 \rightarrow CO_2$).

On the upstream side of the CO shifting section 42, a first cooling section 41 is provided for cooling the reformed gas to a required temperature for the CO shift reaction. On the upstream side of the CO eliminating section 44, a second cooling section 43 is provided for cooling the reformed gas to a required temperature for the CO elimination reaction.

Moreover, as described later, the downstream side of the CO eliminating sections 42 and 44, the gas compressor 51 and the fuel cell 60 are provided. The gas compressor 51 shows better drawing efficiency when a temperature of a drawn fluid is low. The fuel cell 60 shows utmost power generation efficiency when a temperature is at a predetermined temperature (about 80° C.). For the above-described reason, on the downstream side of the CO eliminating sections 42 and 44, a third cooling section 45 is provided so as to improve the drawing efficiency of the gas compressor 51 and the power generation efficiency of the fuel cell 60.

In order to supply the reformed gas to the fuel cell 60, a push-in-type gas compressor 51 is provided in a reformed gas supply path 50. The gas compressor 51 is driven by the power motor 52. The gas compressor 51 changes an amount of the reformed gas supplied to the fuel cell 60 according to changes in an output demand for the fuel cell 60. By the intake of the gas compressor 51, the air is drawn and supplied to the reforming material supplying section 10. In the gas compressor 51, a pressure is higher at a drafting side than a drawing side. Thus, the pressure can be adjusted so that a pressure Pb of the high temperature fluid passage B is higher than a pressure Pa of the low temperature fluid passage A on the drawing side.

On the downstream side of the gas compressor 51, a fourth cooling section 53 is provided for cooling the reformed gas to an appropriate temperature for an electrochemical reaction in the fuel cell 60, the temperature of the reformed gas having been elevated due to compression by the gas compressor.

The downstream side of the fourth cooling section 53 is connected to the fuel cell 60 as a hydrogen consumption device, and is supplied with the reformed gas containing hydrogen. To the fuel cell 60, the air (oxygen) is also supplied along with hydrogen, and power is generated due to the electrochemical reaction of hydrogen and oxygen. In the fuel cell 60, an off gas containing unreacted hydrogen, which has not been used for power generation, is emitted.

On the upstream side of the heat exchange section 20 in the high temperature fluid passage B, the combustion gas supply section (an off gas supply section) 70 is provided for heating the heat exchange section 20. The combustion gas supply section 70 includes the off air flow rate control valve 71, a fuel flow rate control valve (a combustion fuel supply section) 72, the spray nozzle 73, an ignition plug (igniting means) 74, and mixing/combustion chamber 75.

To the combustion gas supply section 70, the off gas containing unreacted hydrogen discharged from the fuel cell 60 is supplied through the off gas supply path 61. Thereby, the low temperature fluid passage A and the high temperature fluid passage B are linked via the reformed gas supply path 50 and an off gas supply path 61. Moreover, to the combustion gas supply section 70, the off air containing unreacted oxygen discharged from the fuel cell 60 is supplied through an off air supply path 62.

The off gas and the off air are sprayed from the spray nozzle 73 to the mixing/combustion chamber 75 so as to make an off gas mixture. The off gas mixture is supplied to the heat exchange section 20, and generates the combustion gas by catalyst combustion by the oxidization catalyst provided in the heat exchange section 20. The combustion heat of the combustion gas heats up the rotary thermal storage 21. The rotary thermal storage 21 receives the heat in the high temperature fluid passage B, and heats up the reforming material in the low temperature fluid passage A by rotating.

When the hydrogen supply device is actuated, instead of the off gas, an actuation fuel (the combustion fuel), whose flow rate is controlled by the fuel flow rate control valve, is sprayed to the combustion chamber 75, and is ignited by the ignition plug 74, thereby generating the combustion gas by flame combustion. In first embodiment, similarly to the reforming fuel, a liquid petroleum type fuel is used as the actuation fuel.

In the vicinity of the heat exchange section 20 in the low temperature fluid passage A (the upstream side of the heat exchange section 20 in the present embodiment), a first pressure sensor (first pressure detection means) 80 is provided for detecting a pressure Pa of a portion where the rotary thermal storage 21 is provided in the low temperature fluid passage A. Moreover, in the vicinity of the heat exchange section 20 in the high temperature fluid passage B (the downstream side of the heat exchange section 20 in the present embodiment), a second pressure sensor (a second pressure detection means) 81 is provided for detecting a pressure Pb of a portion where the rotary thermal storage 21 is provided in the high temperature fluid passage B. The pressure sensors 80 and 81 detect pressure Pa and Pb, respectively, of fluid which passes through the through holes 21a on the low temperature fluid passage A side of the rotary thermal storage 21 and the high temperature fluid passage B side thereof, respectively.

Moreover, the downstream side of the heat exchange section 20 in the high temperature fluid passage B is provided with a throttle tube (a combustion gas exhaust passage) 82, and the throttle tube 82 is provided with an exhaust control valve (a pressure adjustment means) 83 for altering a passage area.

With the above-described gas compressor 51 and the exhaust control valve 83, a pressure can be added to the high temperature fluid passage B. Moreover, a pressure can be reduced in the low temperature fluid passage A with the intake control valve 14 of the air supply passage 13 in the gas compressor 51 and the reforming material supply section 10. Specifically, when the gas compressor 51 is activated, the area of the combustion gas exhaust passage 82 may be reduced by the exhaust control valve 83 so as to increase a resistance of the exhaust, thus increasing the pressure Pb of the high temperature fluid passage B. Likewise, when the gas compressor 51 is activated, the area of the air supply passage 13 may be reduced by the intake control valve 14 so as to increase a resistance of the drawn air, thus reducing the pressure Pa of the low temperature fluid passage A.

Figure 5:
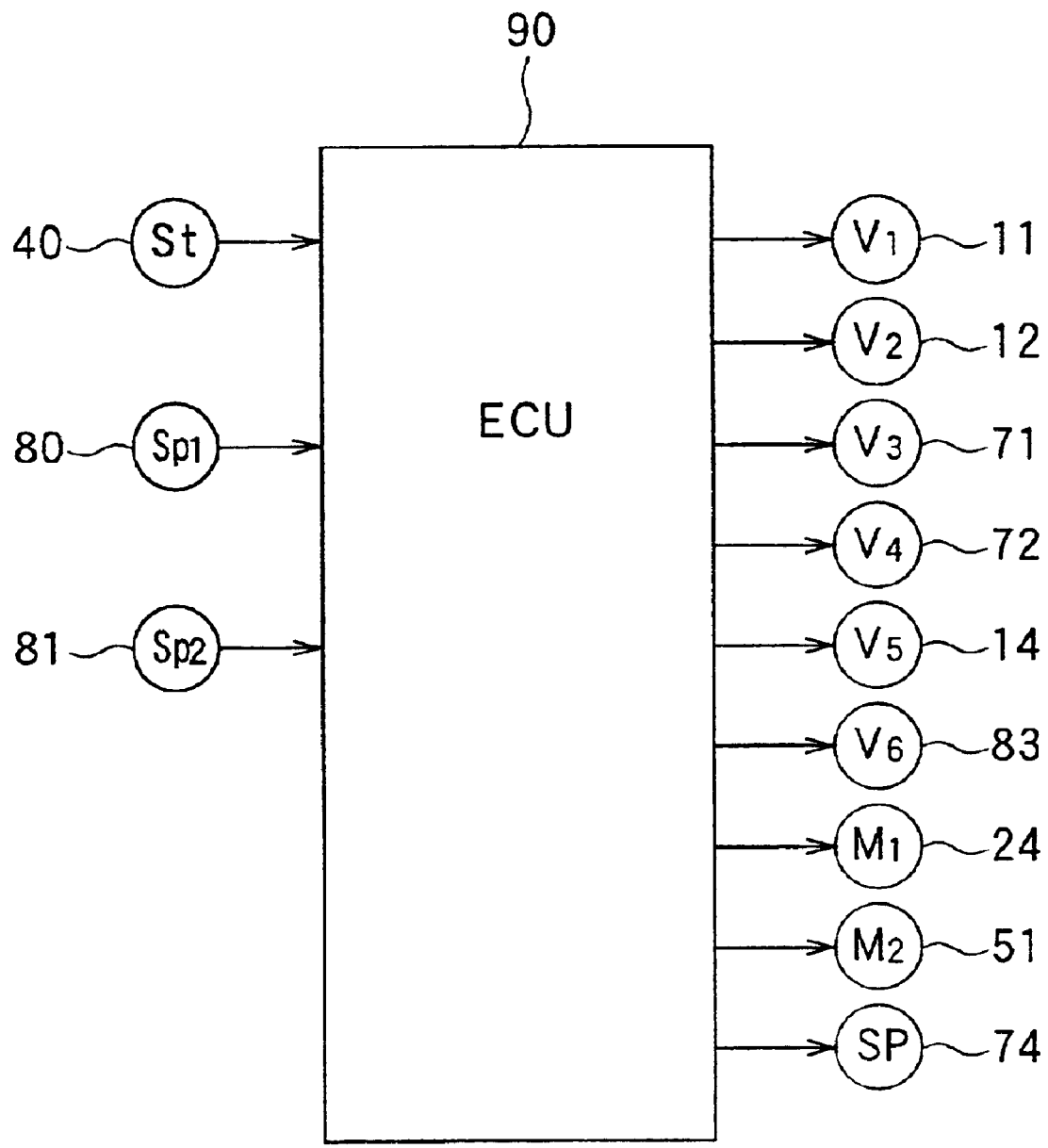
FIG. 5 is a block diagram illustrating a controlling system of the hydrogen supply device according to the first embodiment.

FIG. 5 illustrates controlling system of the hydrogen supply device according to the present embodiment. As shown in FIG. 5, the hydrogen supply device of first embodiment includes a control section (ECU) 90 for performing various controls. A temperature signal detected by the temperature sensor 40 and a pressure signal detected by the pressure sensors 80 and 81 are input to the control section 90 so as to output control signals to each of the flow rate control valves 11, 12, 71 and 72, the intake control valves 14 and 83, the driving motor 24 for the rotary thermal storage, and the ignition plug 74.

An activation of the hydrogen supply device having the above-described structure will be described below. First, actuation of the hydrogen supply device will be described. In order to start a reforming reaction in the reforming section 30, it is necessary that the reforming material supplied to the reforming section 30 is evaporated, and that a temperature of the reforming catalyst of the reforming section 30 is elevated to a predetermined temperature so as to be able to start the reforming reaction.

Then, in the combustion chamber 75 of the combustion gas supply section 70, the actuation fuel and the air is mixed to generate a fuel-air mixture, and then ignited by the ignition plug 74 for flame combustion. The combustion gas generated by the flame combustion flows through the heat exchange section 20 by running through the high temperature fluid passage B. Thereby, a portion of the rotary thermal storage 21 located in the high temperature fluid passage B is heated by the combustion gas. At this time, the gas compressor 51 is activated to supply the air to the reforming material supply section 10.

Due to rotation of the rotary thermal storage 21, the portion which is heated by the combustion gas moves to the low temperature fluid passage A, thus causing the air flowing in the low temperature fluid passage A to be heated. Because the heated air flows in the low temperature fluid passage A, each component on the downstream side of the heat exchange section 20 is rapidly warmed up.

At that time, the combustion gas generated in the combustion gas supply section 70 contains a harmful gas due to incomplete combustion or the like. However, when the combustion gas passes through the rotary thermal storage 21, the gas is catalytically combusted by the oxidization catalyst 25 affixed on the surface of the through holes 21a (i.e., a catalytic oxidization reaction has occurred). Thus, the combustion gas can be used completely for an oxidization reaction (complete combustion) when a mixture ratio of the actuation fuel and the air is appropriately adjusted for the flame combustion, and the harmful component in the combustion gas is catalytically combusted in the heat exchange section 20. Accordingly, the harmful gas contained in the combustion gas is sufficiently clarified to be exhausted to the outside.

The combustion heat of the combustion gas rapidly warms up (i.e., pre-heats) each component of the reforming system such as the heat exchange section 20, the reforming section 30, and the CO eliminating sections (the shift section and purifying section) 42 and 44. Then, when a temperature of the reforming section 30 detected by the temperature sensor 40 reaches the predetermined temperature for starting a reforming reaction, components of the reforming system including the reforming catalyst identifies that the temperature has reached to the point where the reforming reaction can be initiated. Accordingly, the actuation fuel supplied in the combustion gas supply section 70 is ceased to stop the flame combustion.

The predetermined temperature for starting the reforming reaction may be arbitrarily set according to a type and the like of the synthetic fuel. When a petroleum type fuel is used as the reforming fuel as in first embodiment, the temperature may be set to about 300° C. to 400° C.

When warming up of each component is completed, the reforming material supply section 10 starts supplying the reforming material (the mixture of water, air and reforming fuel). The reforming material is heated and evaporated in the heat exchange section 20. The evaporated reforming material is reformed in the reforming section 30 to the reformed gas containing $H_2$ and CO. CO of the reformed gas is eliminated in the CO eliminating sections 42 and 44, and supplied to the fuel cell 60 by the gas compressor 51.

In the fuel cell 60, a chemical reaction occurs between hydrogen and oxygen to generate power, and the off gas containing unreacted hydrogen and the off air containing unreacted oxygen are emitted. The off gas and the off air are introduced into the combustion gas supply section 70 of the high temperature fluid passage B through an off gas introducing channel 61 and the off air supply path 62, respectively, so as to become an off gas mixture. The off gas mixture is supplied to the heat exchange section 20, and the catalytic combustion is initiated as it passes through the rotary thermal storage 21. The heat generated by the catalytic combustion of the off gas is stored in the rotary thermal storage 21. When the rotary thermal storage makes rotating movement, the reforming material passing through the low temperature fluid passage A is heated and evaporated.

As such, the heat generated by the catalytic combustion of the off gas heats up the reforming material for evaporation, and the downstream side of the reforming section 30 may be heated through the heated reforming material. Accordingly, heating of the heat exchange section 20 and the reforming section 30 is switched from heating by the flame combustion of the actuation fuel to heating by the off gas combustion, thus enabling to start self-driving of the hydrogen supply device.

At that time, by adjusting output of the gas compressor 51 and valve travel of the intake control valve 14 and the exhaust control valve 82, pressure detected by the pressure sensors 80 and 81 is adjusted so that the pressure Pb of the high temperature fluid passage B and the pressure Pa of the low temperature fluid passage A are isobaric, or the pressure Pb of the high temperature fluid passage B becomes higher than the pressure Pa of the low temperature fluid passage A. With respect to preventing the gas leakage caused by sealing leakage, it is preferable that the pressure Pa of the low temperature fluid passage A and the pressure Pb of the high temperature fluid passage are isobaric.

It should be understood that the term "isobaric" used herein includes a case where the pressure Pb of the high temperature fluid passage B is slightly lower than the pressure Pa of the low temperature fluid passage A as long as 1) fluid does not leak from the low temperature fluid passage A to the high temperature fluid passage B via a space of the sealing portion of the gas seals 22 and 23 and the rotary thermal storage 21 in the heat exchange section 20, or 2) occurrence of the fluid leakage is in a range that a discharge of the harmful gas to the outside can be ignored.

Next, when a load in the fuel cell 60 fluctuates, an amount of the reforming material supplied from the gas compressor 51 is adjusted according to the load fluctuation of the fuel cell 60 so as to adjust an amount of hydrogen supplied to the fuel cell 60. At that time, when the amount of the reforming gas supplied from the gas compressor 51 increases, the pressure Pb of the high temperature fluid passage B becomes higher, and when decreases, it becomes lower. For this reason, the valve travel of the intake control valve 14 and the exhaust control valve 82 is adjusted in order to adjust the pressure so as to become the low temperature fluid passage pressure Pa≦the high temperature fluid passage pressure Pb.

When the supply amount of hydrogen increases in the hydrogen supply device, a temperature of the reforming section 30 lowers due to an increase of heat absorption caused by the reforming reaction in the reforming section 30, and thus it become necessary to increase a heating amount of the reforming section 30. However, there is a time lag between the increase in the supply amount of hydrogen in the hydrogen supply device and an increase in an exhaust amount of the off gas in the fuel cell 60. Thus, when the supply amount of hydrogen in the hydrogen supply device is rapidly increased, the combustion heat from the off gas combustion may become insufficient. In this case, by temporarily spraying the actuation fuel in the combustion gas supply section 70 to ignite by the ignition plug 74, the combustion heat of the flame combustion may be used for feeding the heat. Accordingly, the reforming reaction can always be facilitated under a desired temperature.

Moreover, by increasing the mixture ratio of the air in the reforming material, it is possible to increase a rate of a partial oxidization reaction (exothermal reaction) in the reforming section 30, thus increasing the heat generation amount in the reforming section 30. This also can be used to compensate any shortage of the combustion heat of the off gas combustion. Furthermore, by accelerating the rotation speed of the rotary thermal storage 21, a heat transfer rate from the high temperature fluid passage B to the low temperature fluid passage A can be increased, thereby compensating the combustion heat shortage of the off gas combustion.

It should be appreciated that the temperature sensor 40 can directly detect lowering of a temperature of the reforming section 30 due to the load increase in the fuel cell 60. Alternatively, when the fuel cell 60 is used as a driving power of a motor for vehicle running, for example, it may have a structure in which a load fluctuation of the fuel cell 60 is predicted based on a degree of throttle opening so as to predict a change in the temperature of the reforming section 30.

In order to stop the supply of hydrogen from the hydrogen supply device to the fuel cell 60, supply of the reforming fuel and water are stopped first, and then the air supply is stopped. During that time, a combustible mixture gas remaining in the low temperature fluid passage A is combusted completely within the heat exchange section 20 in the high temperature fluid passage B or the catalytic combustion on a surface thereof, thus suppressing an exhaust of emission. Moreover, by closing the intake control valve 14 and the exhaust control valve 83 at the time of stopping the hydrogen supply device, the harmful gas can be confined in the hydrogen supply device, thus enabling to effectively prevent the harmful gas from exhausting to the outside.

Figure 6C:
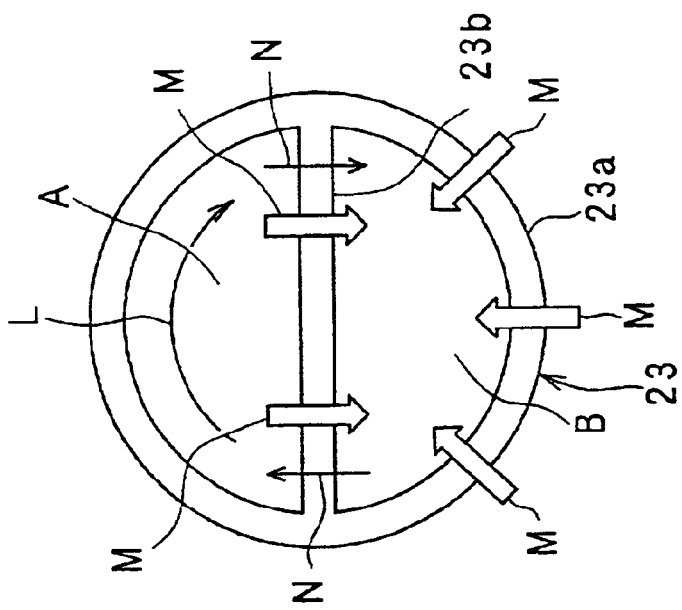
FIGS. 6A to 6C are enlarged cross sectional views illustrating sealing conditions of the rotary thermal storage by the gas seals.
Figure 6B:
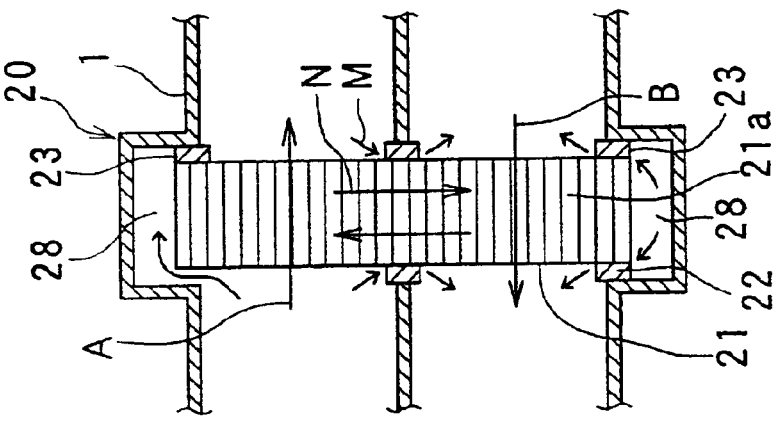

Now, referring to FIGS. 6A to 7C, a gas leak that occurs in the rotary heat exchanger 20 will be described. FIGS. 6A to 7C are enlarged cross sectional views illustrating sealing conditions of the rotary thermal storage 21 by the gas seals 22 and 23. FIGS. 6B and 7B illustrate cross sectional structures of the rotary thermal storage 21 and the gas seals 22 and 23. FIGS. 6A, 7A, 6C and 7C illustrate the gas seals 22 and 23 as viewed from a flowing direction of each fluid. The rotary thermal storage 21 rotates in an arrow L direction.

Figure 6A:
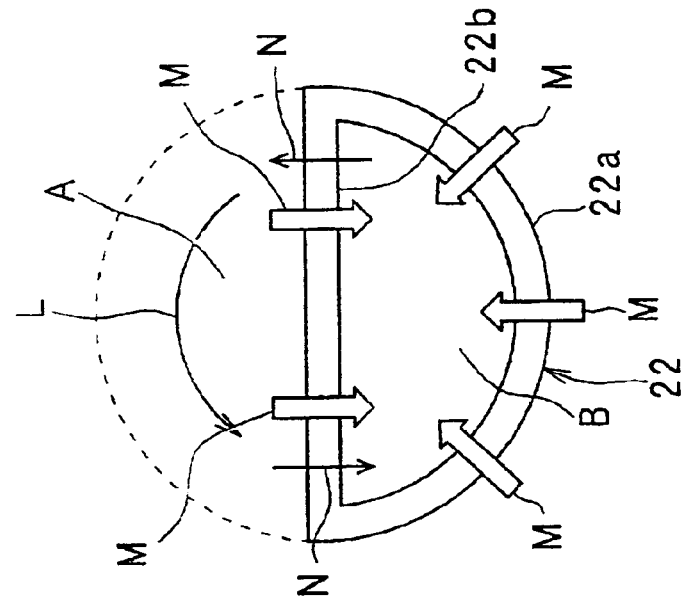

As shown in FIG. 6B, the rotary thermal storage 21 has many through holes 21a formed therein. It is arranged to cross over both of the low temperature fluid passage A for passing the reforming material and the high temperature fluid passage B for passing the combustion gas. Also, on end surfaces of both sides of openings of the through hole 21a of the rotary thermal storage 21, the gas seals 22 and 23, which are fixed on the housing 1, are disposed, so that the rotary thermal storage 21 makes sliding rotation movement between the gas seals 22 and 23 in the arrow L direction as shown in FIGS. 6A and 6C.

There are two types of gas leaks occurring in the rotary heat exchanger 20: One is a seal leakage M which directly leaks between the rotary thermal storage 21 and the gas seals 22 and 23; and the other is a transfer leakage N due to transferring while being trapped in the rotary thermal storage 21. The seal leakage M is occurred because of pressure difference between the low temperature fluid passage A and the high temperature fluid passage B, and the space in the contact surface between the rotary thermal storage 21 and the gas seals 22 and 23.

A leakage amount of the transfer leakage N is increased or decreased according to rotation speed of the rotary thermal storage 21. Since the rotary thermal storage 21 is usually used under low speed rotation (equal or less than 50 revolution per minute, for example), the leakage amount is smaller than the seal leakage M, and it may be ignored.

The low temperature fluid passage A and the high temperature fluid passage B are linked through the fuel cell. Due to a loss of the pressure, the high temperature fluid passage B on the downstream side is usually low pressured when compared to the low temperature fluid passage A on the upstream side. Thus, as shown in FIGS. 6A to 6C, the seal leakage M in the heat exchange section 20 occurred in a direction from the low temperature fluid passage A to the high temperature fluid passage B.

Such seal leakage M exists in two ways: one is a gas leak entering from the low temperature fluid passage A to the high temperature fluid passage B through the cross arms 22b and 23b of the gas seal 22 and 23; and the other is a gas leak entering into the high temperature fluid passage B through the flanges 22a and 23a of the gas seals 22 and 23 after a fluid turns into the high temperature fluid passage B side, the fluid having been entered into the space 28 formed between the rotary thermal storage 21 and the housing 1 in the low temperature fluid passage A.

Because of the gas leakage described above, unreacted combustion gas or a harmful gas existing during a reaction process may leak out from the low temperature passage A to the high temperature fluid passage B through the sealing portion, thereby it is discharged out as being mixed with the combustion gas. Thus, there is a possible concern for exhausting the harmful gas to the outside as well as losing the reforming material.

In first embodiment, the gas compressor 51 and the pressure control valves 14 and 83 are provided so as to adjust the pressure Pb of the high temperature fluid passage B is set to be equal or higher than the pressure Pa of the low temperature fluid passage A. Thereby, a space leakage M from the low temperature fluid passage A to the high temperature fluid passage B is prevented, thus enabling to limit only to the transfer leakage N, which occurs in a small amount thus having less influence.

Specifically, when the high temperature fluid passage pressure Pb equals to the low temperature fluid passage pressure Pa, there is no space leakage due to pressure difference between two passages. When the high temperature fluid passage pressure Pb is higher than the low temperature fluid passage pressure Pa, as shown in FIGS. 7A to 7C, the space leakage M flows from the high temperature fluid passage B to the low temperature fluid passage A, and thus, it is possible to prevent unreacted reforming material in the low temperature passage A from leaking into the high temperature fluid passage B and being discharged to the outside. At that time, the combustion gas in the high temperature fluid passage B leaks into the low temperature fluid passage A due to the space leakage M, but it circulates within the hydrogen supply device. Therefore, there is no problem of exhausting the emission to the outside.

As described above, according to the hydrogen supply device of first embodiment, by placing the gas compressor 51 between the heat exchange section 20 in the low temperature fluid passage A and the heat exchange section 20 in the high temperature fluid passage B, it is possible to prevent fluid leakage from occurring at the sealing portion between the rotary thermal storage 21 and the gas seals 22 and 23 with a simple structure utilizing a pressure difference of intake and exhaust occurring to the compressor 51.

Moreover, by providing the pressure control valves 14 and 82 as the pressure adjustment means, it is possible to adjust the pressures suitably even if the low temperature fluid passage pressure Pa and the high temperature fluid passage pressure Pb are fluctuated due to fluctuation of a supplied amount of the reforming gas from the gas compressor 51.

Because a pressure loss in the fuel cell 60 is great, the push-in type gas compressor 51 is provided on the upstream side of the fuel cell 60 as in first embodiment, thus enabling to improve efficiency of the gas compressor 51. Moreover, by providing the cooling section 45 on the upstream side of the gas compressor 51, it is possible to supply the chilled reformed gas to the gas compressor 51, thus enabling to improve intake efficiency of the gas compressor 51. Furthermore, by providing the cooling sections 45 and 53 on the upstream side and the downstream side of the gas compressor 51, respectively, it is possible to set a temperature suitable for an electrochemical reaction to the fuel cell 60.

By closing the intake control valve 14 and the exhaust control valve 83 when the hydrogen supply device is stopped, it is possible to confine the harmful gas within the hydrogen supply device, thus enabling effectively to prevent the harmful gas from exhausting to the outside.

(Second Embodiment)

Next, referring to FIG. 8, a hydrogen supply device according to second embodiment of the present invention will be described. When comparing second embodiment with the above-described first embodiment, configurations are different in an evaporation section for evaporating a reforming material, and a reforming section for reforming the reforming material. The same members as in the above-described first embodiment are denoted with the same reference numerals, and description thereof is omitted. In second embodiment, the evaporation section and the reforming section compose a heat exchange section.

As shown in FIG. 8, a rotary heat exchanger includes two rotary thermal storages 21 and 31 so as to have a two-step structure that composes an evaporation section 20 and a reforming section 30. The two rotary thermal storage 21 and 31 are disposed on the same shaft, and are rotary-driven by one driving motor. These rotary thermal storages 21 and 31 have similar structure to first embodiment as shown in FIG. 3 above. In the reforming section 30, a pair of gas seals 32 and 33 has a structure of a θ-shape similar to the gas seal 23. The rotary thermal storage 31 of the reforming section 30 is affixed with a reforming catalyst.

In the reforming material supply section 10, a mixture of water and air is supplied, and a reforming fuel is sprayed to the mixing section 18 from the spray nozzle 17 provided between the evaporation section 20 and the reforming section 30 so as to be supplied to the low temperature fluid passage A. The reforming fuel is mixed with the water-air mixture evaporated in the evaporation section 20, and supplied to the reforming section 30.

As such, in the two-step rotary heat exchanger as in second embodiment, the pressure Pb of the high temperature fluid passage B is kept about the same as or higher than the pressure Pa of the low temperature fluid passage A by the gas compressor 51 and the pressure control valves 14 and 83. Thereby, it is possible to prevent fluid leakage from occurring at the sealing portion of the rotary thermal storages 21 and 31 and the gas seals 22, 23, 32 and 33.

Moreover, with a configuration of second embodiment, the reforming catalyst of the reforming section 30 is directly heated by the combustion gas in the high temperature fluid passage B, so that a temperature rise of the reforming section 30 quickly occurs.

In the above-described embodiments, the gas compressor 51 is provided on the upstream side of the fuel cell 60, though not limited thereto. Alternatively, it may be provided in any position as long as it is on the downstream side of the heat exchange section 20 in the low temperature fluid passage A as well as on upstream side of the heat exchange section 20 in the high temperature fluid passage B. For example, the gas compressor 51 may be provided on the downstream side of the fuel cell 60. In this case, a heat generated by compression at the gas compressor 51 does not need to be considered, and thus, the cooling section 53 on the downstream side of the gas compressor 51 may be omitted.

In the above-described embodiments, the intake control valve 14 and the exhaust control valve 83 are provided as pressure adjustment means. Alternatively, it may take a structure in which the pressure control valves 14 and 83 are omitted, and the pressure Pb of the high temperature fluid passage B is increased by solely using the gas compressor 51 as the pressurizing means. Moreover, in addition to the gas compressor 51, either the exhaust control valve 83 or the intake control valve 14 may be provided. The pressure adjustment means are not limited to the control valves 14 and 83, and it may be constituted of a narrowing pipe-line, which increases a drawing resistance of the air or exhaust resistance of the exhaust gas by narrowing a diameter of a fluid passage.

Moreover, in the above-described embodiments, the off air emitted from the fuel cell 60 is used for combustion in the combustion gas supply section 70, but there is a possibility that oxygen concentration of the off air may be insufficient for the combustion because oxygen has already been consumed at the fuel cell 60. Therefore, it is possible to provide a passage for bypassing some of the air supplied to the fuel cell 60 so that some of the air that by-passed the fuel cell 60 may be supplied to the combustion gas supply section 70.

(Third Embodiment)

Figure 9:
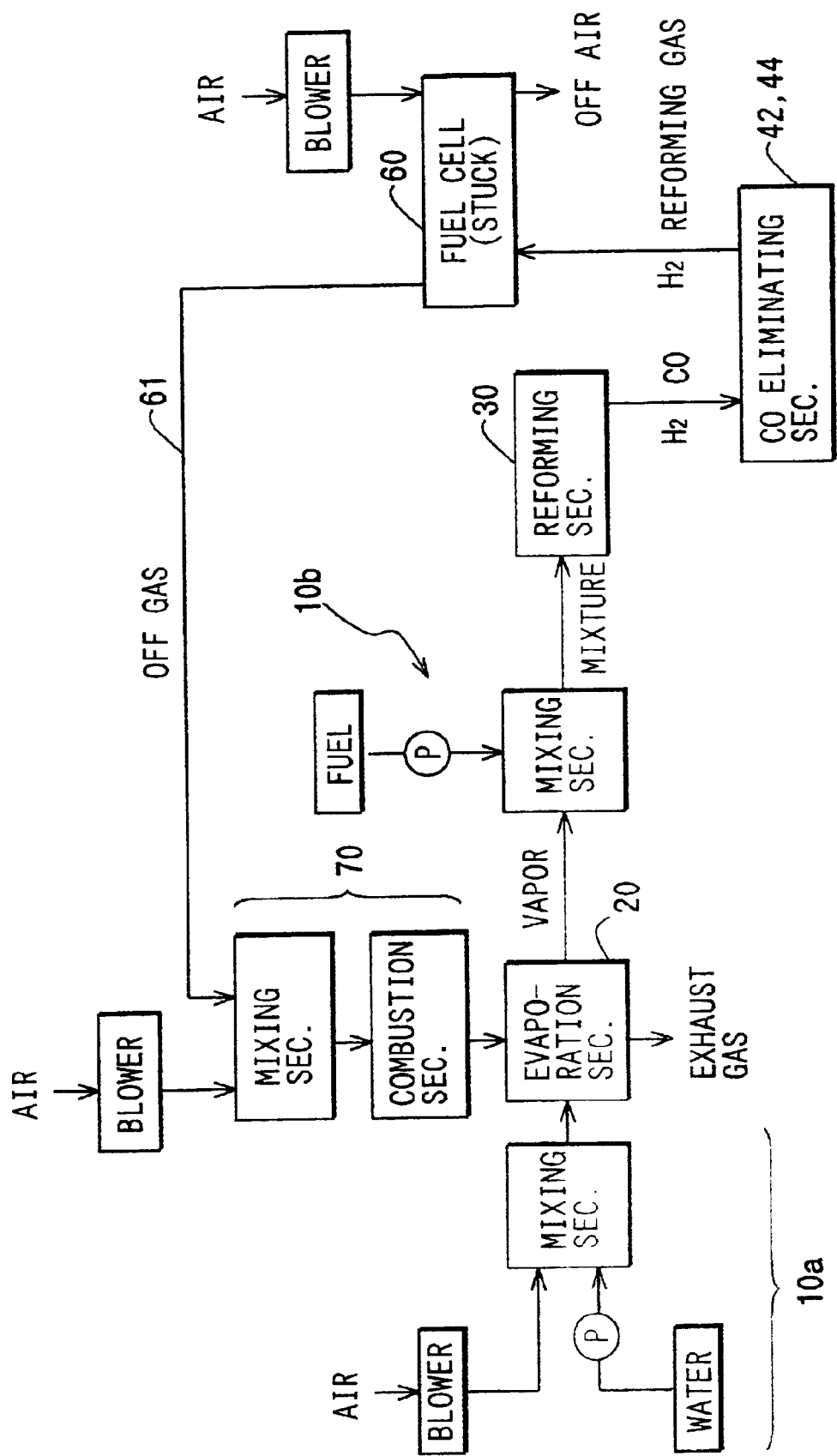
FIG. 9 is a block diagram illustrating a general structure of a hydrogen supply device according to third embodiment of the present invention.
Figure 10:
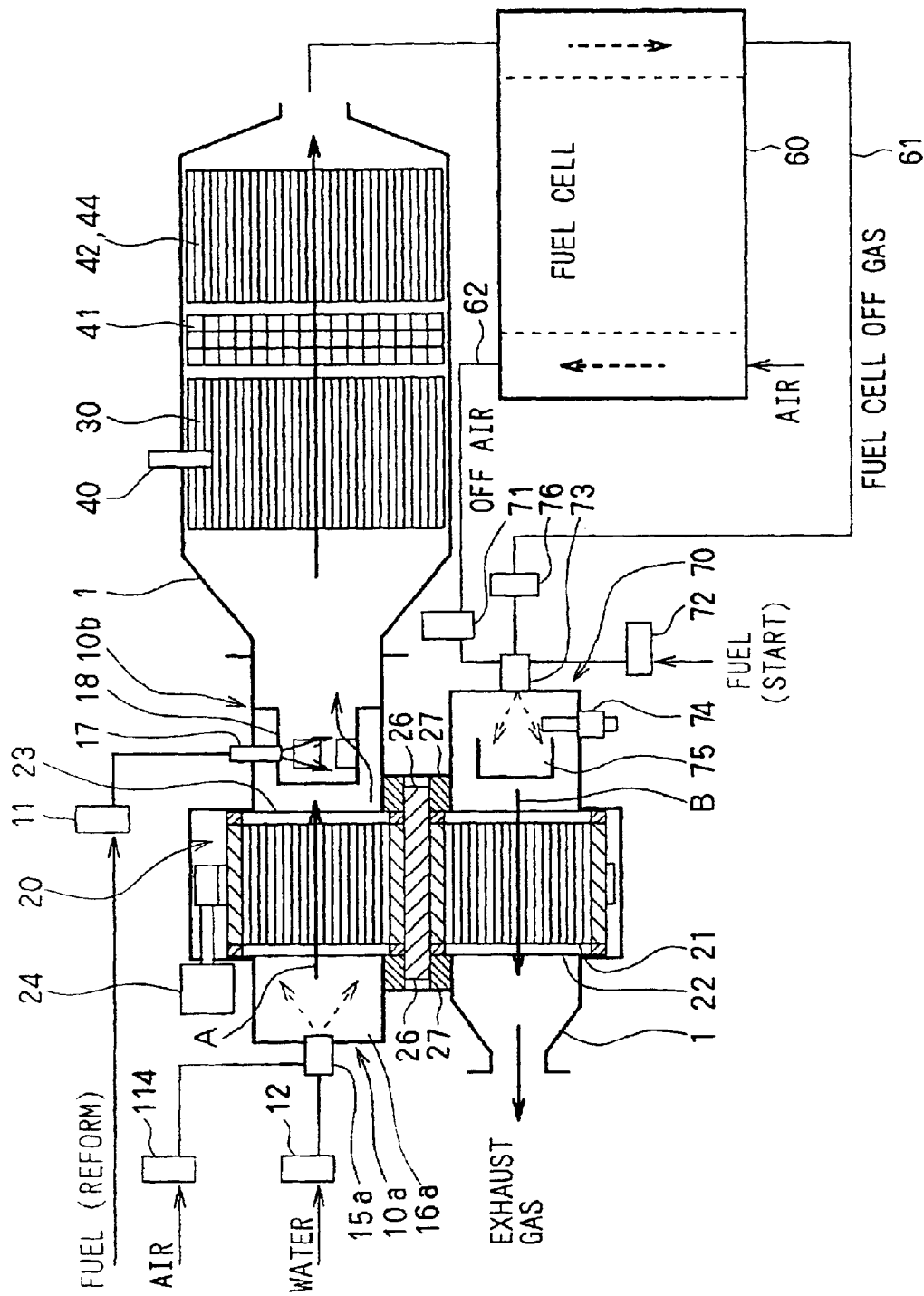
FIG. 10 is a conceptual diagram illustrating an arrangement of components of the hydrogen supply device of FIG. 9.

Referring to FIGS. 9 to 14, third embodiment of the present invention will be described. FIG. 9 is a block diagram illustrating a general structure of a hydrogen supply device according to third embodiment. FIG. 10 is a conceptual diagram illustrating an arrangement of components of the hydrogen supply device.

In the low temperature fluid passage A, a first reforming material (a mixture of water and air) supplied from a first reforming material supply section 10a is heated and evaporated at the heat exchange section 20, and a second reforming material (a reforming fuel containing hydride) is mixed therewith in a second reforming material supply section 10b so as to generate a reforming material composed of water, air and reforming fuel. The reforming material is reformed at the reforming section 30 to a reformed gas containing $H_2$ and CO. After CO is eliminated at the CO eliminating sections 42, 44, it is supplied to the fuel cell 60 as a hydrogen rich gas.

As shown in FIG. 10, the first reforming material supply section 10a for supplying the first reforming materials (water and air) is placed at an upper-most stream portion of the low temperature fluid passage A. The first reforming material supply section 10a includes a water flow rate control valve 12, an air flow rate control valve 114, a spray nozzle 15a, and a mixing chamber 16a. Water and air, whose flow rates are controlled by the water flow rate control valve 12 and the air flow rate control valve 114, respectively, are sprayed into the mixing chamber 16a from the spray nozzle 15a, thus generating a water-air mixture.

On a downstream side of the first reforming material supply section 10a in the low temperature fluid passage A, the heat exchange section (evaporation section) 20 is disposed. In third embodiment, the heat exchange section 20 is a rotary type heat exchanger as in first embodiment.

On the downstream side of the heat exchange section 20, a second reforming material supply section 10b is provided. The second reforming material supply section 10b includes a fuel flow rate control valve 11, a spray nozzle 17, and a mixing chamber (a mixing section) 18.

Figure 11A:
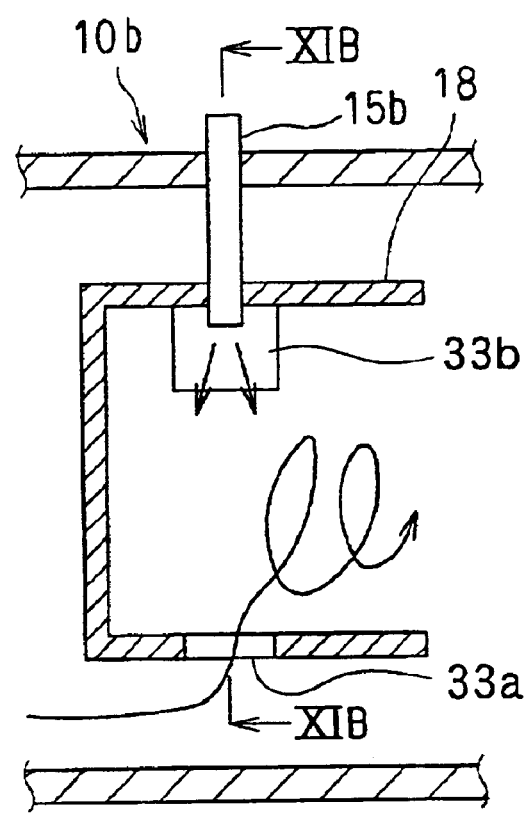
FIG. 11A is an enlarged cross-sectional view of a mixing chamber in which first and second reforming material are mixed.
Figure 11B:
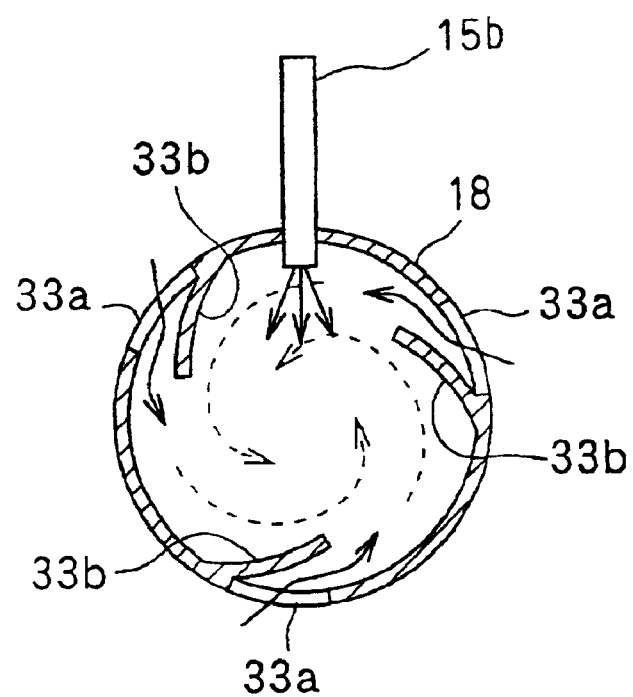
FIG. 11B shows a cross-sectional view taken along XIB—XIB in FIG. 11A.

FIG. 11A is an enlarged cross-sectional view of the mixing chamber 18 in the second reforming material supply section 10b, and FIG. 11B shows a cross-sectional view taken along XI—XI in FIG. 11A. As shown in FIGS. 11A and 11B, the mixing chamber 18 is a cylindrical shape having an opening on the downstream side. The mixing chamber 18 has an inlet port 33a for introducing the first reforming material (the water-air mixture) into the mixing chamber by cutting out a plurality of places inside the peripheral surface (three places in the present invention), and a guiding plate 33b for generating vortex flow of the first reforming material.

In the second reforming material supply section 10b, the synthetic fuel as the second reforming material, whose flow rate is controlled by the fuel flow rate control valve 11, is sprayed into the mixing chamber 18 by the spray nozzle 15b. Thereby, the second reforming material is evaporated after being mixed with the evaporated first reformed material having passed through the heat exchange section 20. At that time, the first reforming material flows into the mixing chamber 18 from a tangential direction of a side surface of the mixing chamber 18 to form the vortex flow in the mixing chamber 18, thus promoting diffusion of the second reforming material. Therefore, it is possible to efficiently mix the first reforming material and the second reforming material in a short period of time.

On the downstream side of the second reforming material supply section 10b, the reforming section 30 is provided.

On the downstream side of the reforming section 30, there are provided a cooling section 41 for cooling a temperature of the reformed gas down to the temperature required for CO elimination, and CO eliminating sections 42 and 44 for generating a hydrogen rich gas by eliminating CO from the reformed gas which is cooled in the cooling section 41. The hydrogen rich gas is supplied to the fuel cell 60.

On the upstream side of the heat exchange section 20 in the high temperature fluid passage B, a combustion gas supply section (an off gas supply section) 70 is provided for heating the heat exchange section 20. The combustion gas supply section 70 includes an off gas flow rate control valve 76, a fuel flow rate control valve (combustion fuel supply section) 72, the off air flow rate control valve 71, the spray nozzle 73, the ignition plug (igniting means) 74, and mixing/combustion chamber 75.

Figure 12:
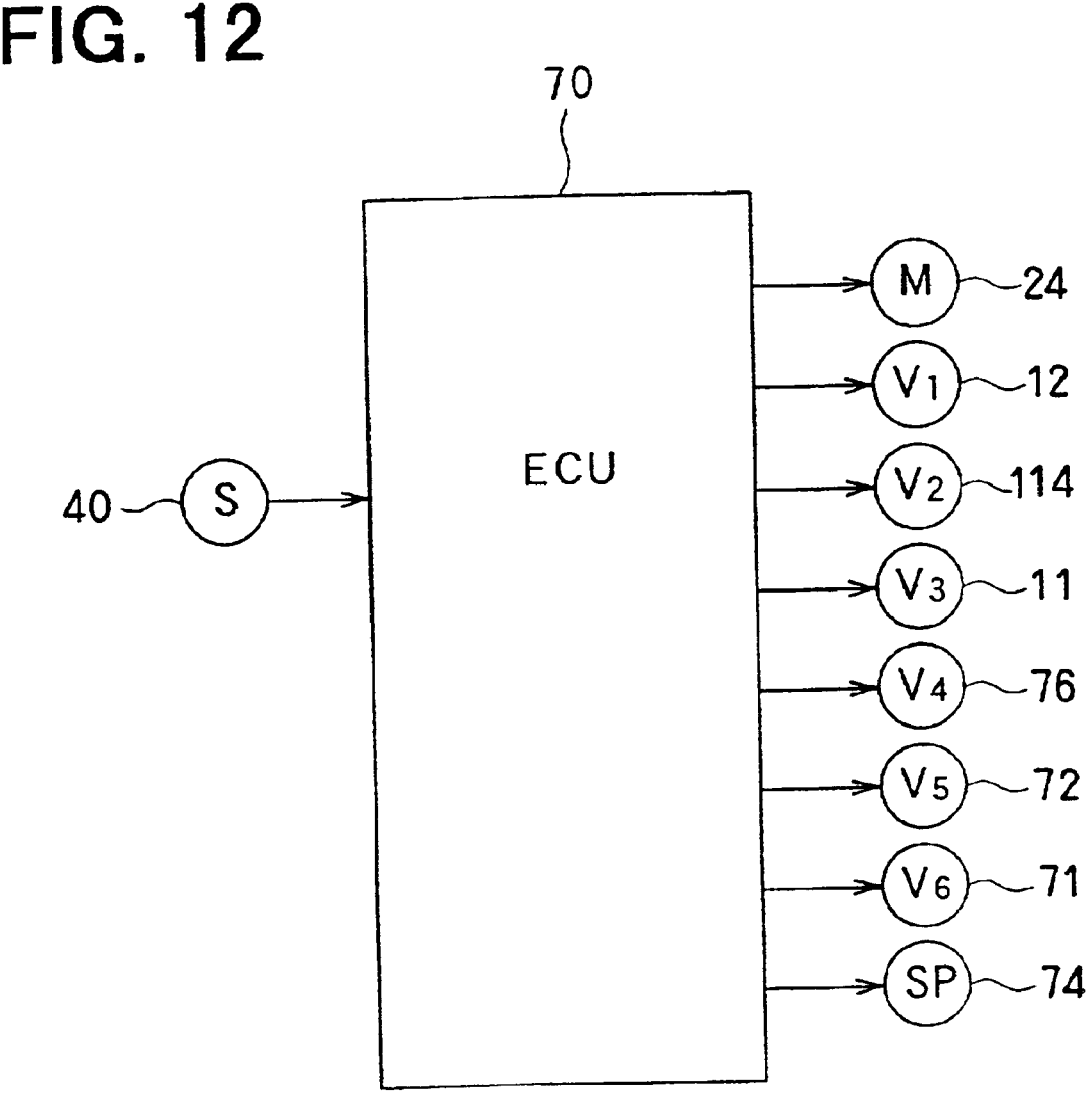
FIG. 12 is a block diagram illustrating controlling system of the hydrogen supply device according to the third embodiment.

FIG. 12 illustrates controlling system of the hydrogen supply device according to the present embodiment. As shown in FIG. 12, the hydrogen supply device of third embodiment includes a control section (ECU) 90 for performing various controls. A temperature signal detected by the temperature sensor 40 is input to the control section 90 so as to output control signals to each of the flow rate control valves 12, 114, 11, 76, 71 and 72, the driving motor 24, and the ignition plug 74.

Operation of the hydrogen supply device having the above-described structure will be described below. First, actuation of the hydrogen supply device will be described. In order to start a reforming reaction in the reforming section 30, it is necessary that the reforming material supplied to the reforming section 30 is evaporated, and that a temperature of the reforming catalyst of the reforming section 30 is elevated to a predetermined temperature so as to be able to start the reforming reaction.

Then, in the combustion chamber 75 of the combustion gas supply section 70, the actuation fuel and the air is mixed to generate a fuel-air mixture, and then ignited by the ignition plug 74 for flame combustion. The combustion gas generated by the flame combustion flows through the heat exchange section 20 by flowing through the high temperature fluid passage B. Thereby, a portion of the rotary thermal storage 21 located in the high temperature fluid passage B is heated by the combustion gas. In the first reforming material supply section 10a, the air is supplied.

Due to rotation of the rotary thermal storage 21, the portion which is heated by the combustion gas moves to the low temperature fluid passage A, thus causing the air running through the low temperature fluid passage A to be heated. Because the heated-air flows in the low temperature fluid passage A, each component on the downstream side of the heat exchange section 20 is rapidly warmed up.

When warming up of each component is completed, the first reforming material supply section 10a starts supplying the first reforming material (the water-air mixture). The first reforming material is heated and evaporated in the heat exchange section 20. It is mixed with the second reforming material (the reforming fuel) in the second reforming material supply section 10b, and evaporated so as to generate a reforming material composed of water, air and reforming fuel.

The evaporated reforming material is reformed in the reforming section 30 to the reformed gas containing $H_2$ and CO. After the reformed gas is cooled in the cooling section 41, CO of the reformed gas is eliminated in the CO eliminating sections 42 and 44, and supplied to the fuel cell 60.

In the fuel cell 60, power is generated due to a chemical reaction between hydrogen and oxygen. At the same time, the off gas containing unreacted hydrogen and the off air containing unreacted oxygen are exhausted. The off gas and the off air are introduced into the combustion gas supply section 70 in the high temperature fluid passage B through the off gas introducing channel 61 and the off air introducing channel 62, respectively, so as to become the off gas mixture. The off gas mixture is supplied to the heat exchange section 20, and initiates a catalytic combustion as it passes through the rotary thermal storage 21. The heat generated by the catalytic combustion of the off gas is stored in the rotary thermal storage 21. When the rotary thermal storage makes rotating movement, the reforming material passing through the low temperature fluid passage A is heated and evaporated.

As such, the heat generated by the catalytic combustion of the off gas heats up the reforming material for evaporation, and the reforming section 30 on the downstream side can be heated through the heated reforming material. Accordingly, heating of the heat exchange section 20 and the reforming section 30 is switched to heating by the off gas combustion instead of heating by the flame combustion of the actuation fuel, thus enabling to start self-driving of the hydrogen supply device.

When the rotary heat exchanger is used as in the heat exchange section 20 of third embodiment, gas leakages occurs in the heat exchange section 20 form the high-pressure low temperature fluid passage A to the low-pressure high temperature fluid passage B.

To deal with the problem, third embodiment has a structure in which a supply source of multiple reforming materials is divided, and the reforming material is supplied on the downstream side of the heat exchange section 20, so that the material does not go through the rotary heat storing type heat exchange section 20. With such structure, only the first reforming material (water and the air) without the reforming fuel passes through the heat exchange section 20 on the low temperature fluid passage A side, and therefore, leaked gas to the high temperature fluid passage B does not contain any harmful component. The first reforming material is heated to a high temperature by passing through the heat exchange section 20. The heated first reforming material performs heating, evaporation, and mixing of the second reforming material (a liquid reforming fuel) on the downstream side of the heat exchange section 20, so as to generate the reforming material composed of water, air and reforming fuel.

According to the hydrogen supply device having the above-described structure according to third embodiment, by supplying water and air (as a part of reforming material) on the upstream side of the heat exchange section 20 and by supplying the reforming fuel on the downstream side of the heat exchange section 20, it is possible to prevent deposition of the reforming fuel in the heat exchange section 20 from generating, thereby pollution of the heat exchange section 20 can be avoided, and blockage of the through holes 21a of the heat exchange section 20 by the deposition can be prevented. Therefore, maintenance of the heat exchange section 20 becomes unnecessary, thus reducing the cost thereof.

As described above, by supplying the reforming fuel on the downstream side of the heat exchange section 20, it is possible to prevent the unreacted reforming fuel as a harmful gas from exhausting to the outside when the gas leakage occurs in the rotary heat exchanger.

Moreover, when the second reforming material (the reforming fuel) is supplied on the downstream side of the heat exchange section 20 as in third embodiment, it is necessary to mix the first and the second reforming materials effectively and in a short period of time because of a short distance between the second reforming material supply section 10b and the reforming section 30. In the second reforming material supply section 10b according to third embodiment, the mixing section 18 having an inlet port 33a and the guide plate 33b formed therein is provided. Thereby, a vortex flow is generated to the first reforming material within the mixing chamber 18, thus enabling to mix the first reforming material and the second reforming material efficiently and rapidly.

(Fourth Embodiment)

Figure 13:
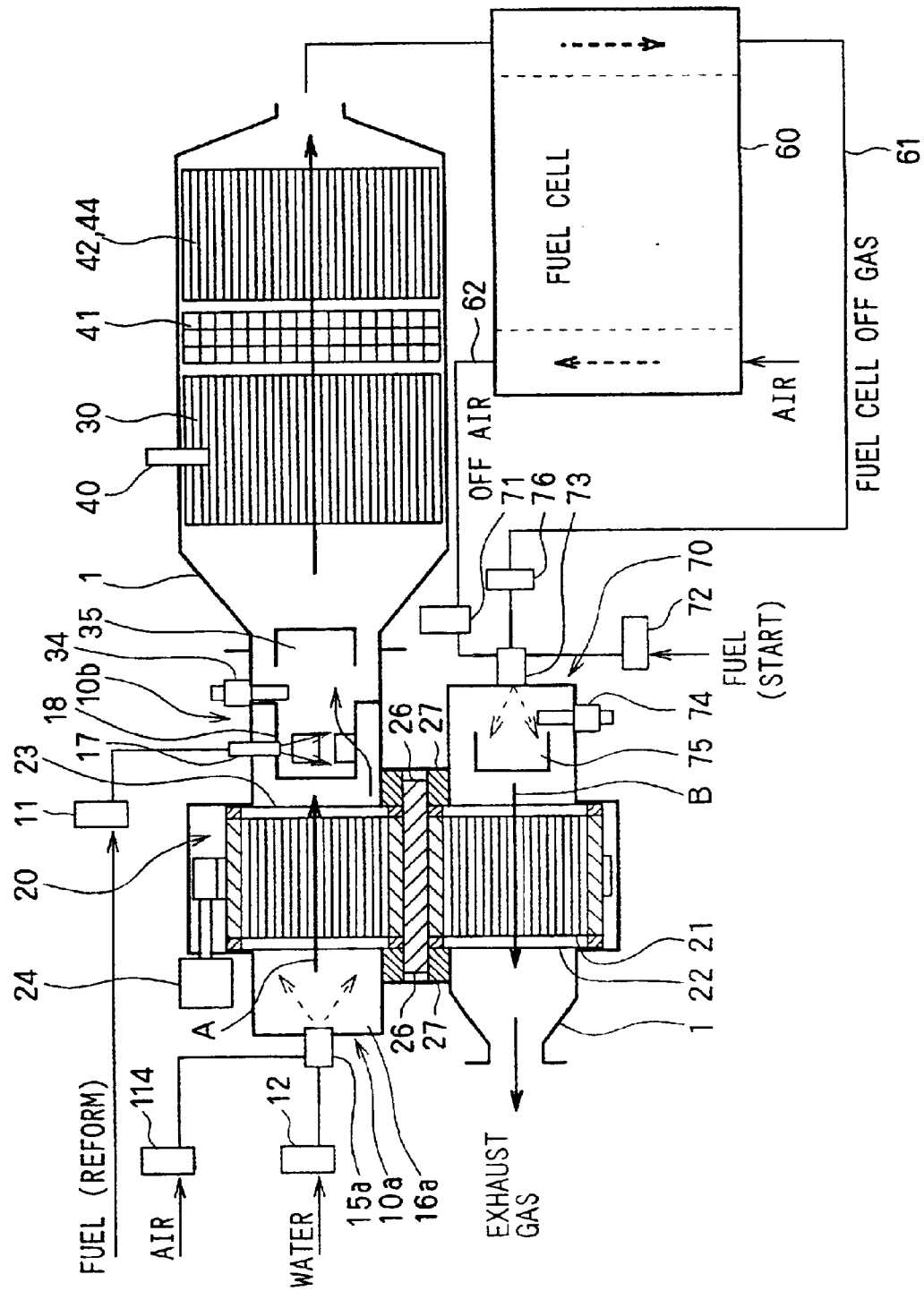
FIG. 13 is a conceptual diagram illustrating a general structure of a hydrogen supply device according to fourth embodiment of the present invention.

Referring now to FIG. 13, fourth embodiment of the present invention will be described. As shown in FIG. 13, when fourth embodiment is compared to the above-described third embodiment described above, it is different in that a ignition plug 34 and a combustion chamber 35 are provided in the second reforming material supply section 10b enables to rapidly heat up. Members similar to the above-described third embodiment will be denoted with the same reference numerals, and description thereof is omitted.

As described above, in a hydrogen supply device according to fourth embodiment, the second reforming material supply section 10b is provided with the ignition plug 34 for igniting the synthetic fuel for flame combustion, and the combustion chamber 35 for maintaining the flame combustion.

With the above-described structure, at a time of the hydrogen supply device actuation, the flame combustion can be generated in the reforming material supply section 10b in addition to the flame combustion in the combustion gas supply section 70. The combustion heat of the flame combustion in the second reforming material supply section 10b, the reforming section placed immediately below can be heated rapidly, thus enabling to perform a start-up of the reforming reaction even more rapidly.

Moreover, when a load of the fuel cell 60 is fluctuated, by temporary generating the flame combustion in the second reforming material supply section 10b, the reforming section 30 is heated, thus enabling to rapidly supply a deficiency of the combustion heat of the off gas.

Figure 14A:
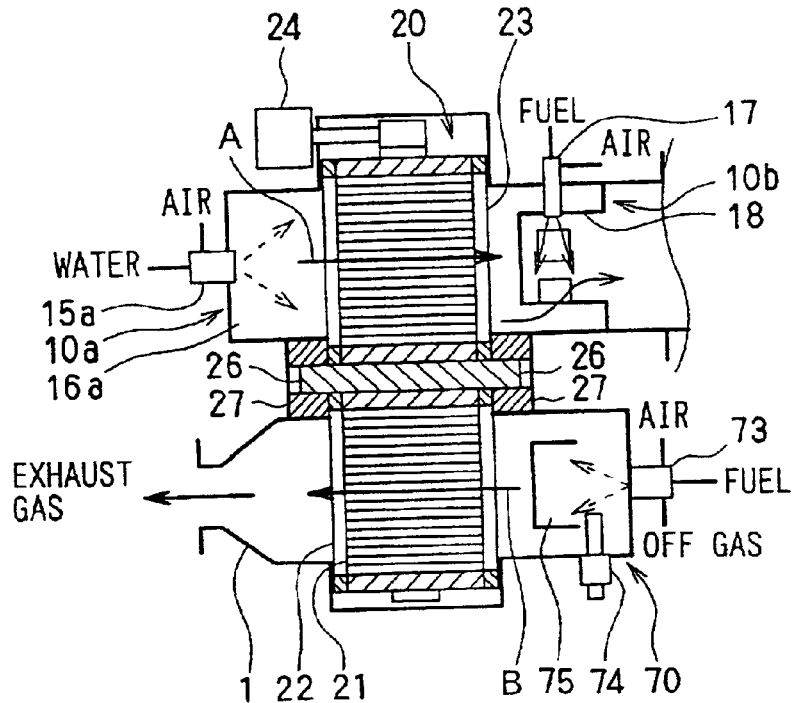
FIGS. 14A and 14B are conceptual diagrams illustrating another examples of the first and second reforming supply sections of FIG. 13.
Figure 14B:
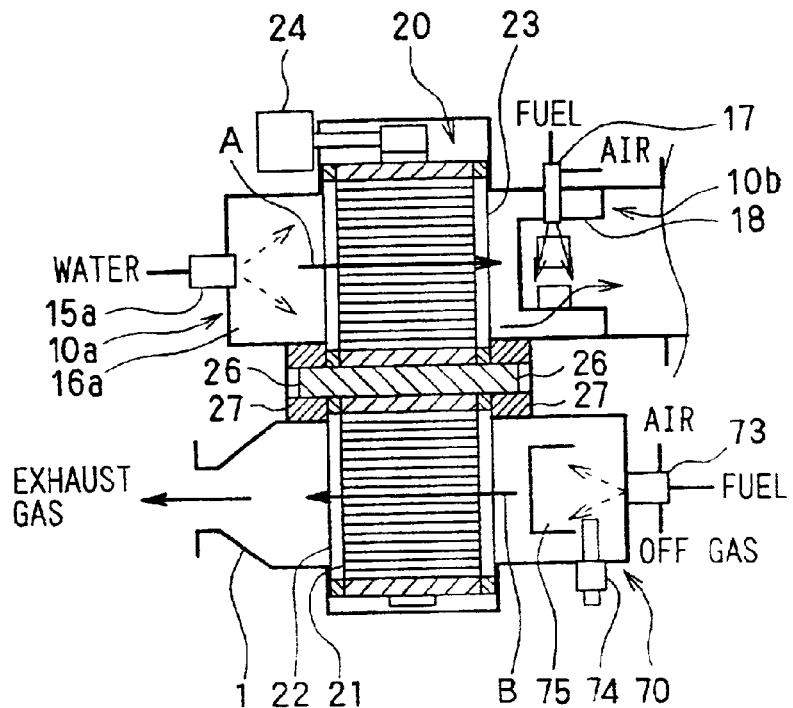

The hydrogen supply device according to third embodiment and fourth embodiment has a structure in which the air in the reforming material is supplied to the first reforming supply section 10a. Alternatively, it may have a structure as shown in FIGS. 14A and 14B. In an example shown in FIG. 14A, the air is supplied from both of the first reforming material supply section 10a and the second reforming material supply section 10b. According to the structure shown in FIG. 14A, in the second reforming material supply section 10b, atomization of the reforming fuel sprayed into the mixing chamber 18 can be promoted even under a low pressure. Moreover, as shown in FIG. 14B, only the second reforming material supply section 10b may supply the air.

Figure 15:
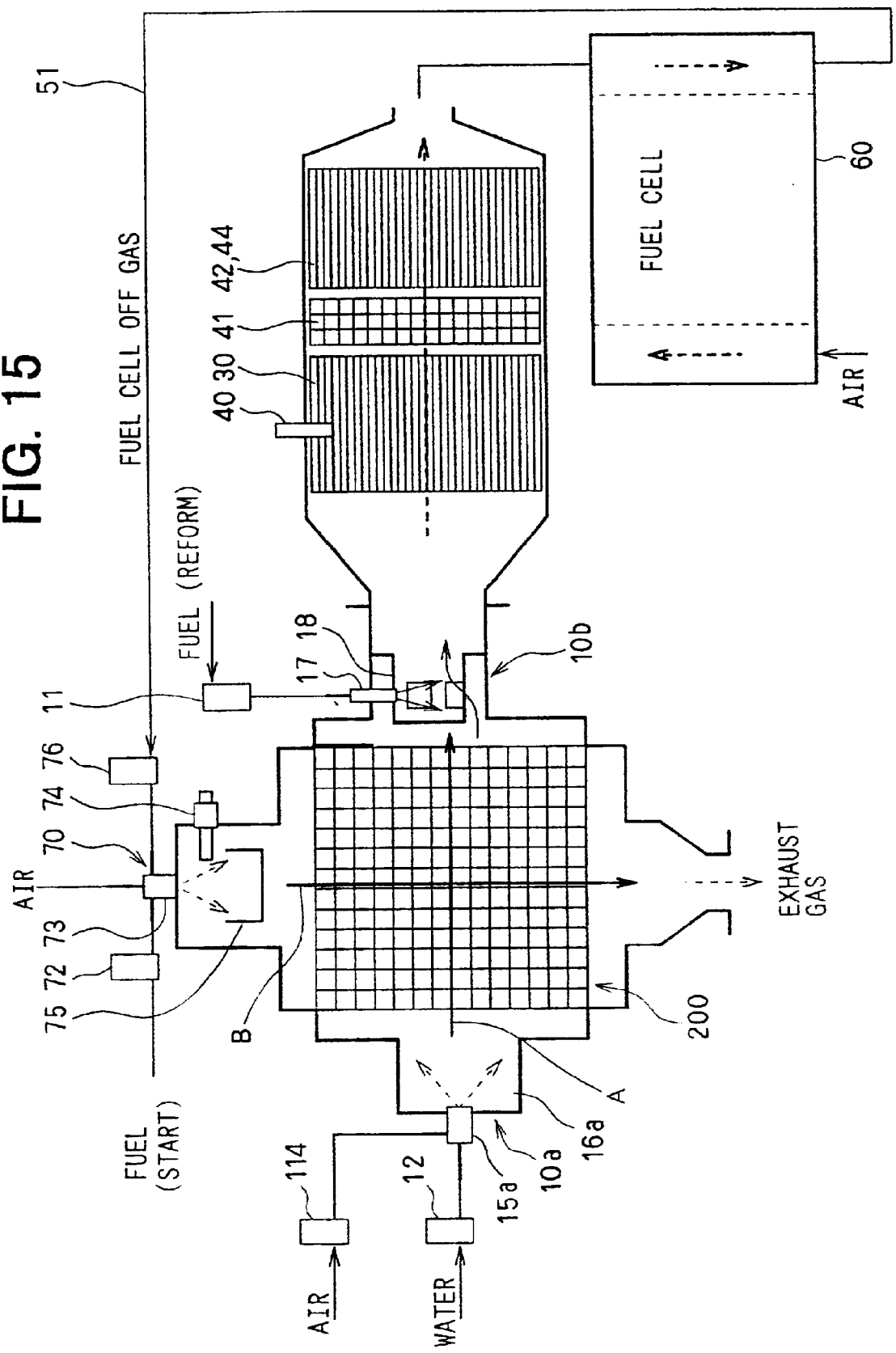
FIG. 15 is a conceptual diagram illustrating a modification of the heat exchanger of FIG. 13.

Moreover, in the hydrogen supply device according to each of the above-described embodiments, the rotary heat exchanger is used as the heat exchange section 20. However, the present invention is not limited to this, and alternatively, various types of heat exchanger may be used. For example, a cross-flow type heat exchanger 200 such as a fin-tube type as shown in FIG. 15 may be used. Even when the cross-flow type heat exchanger 200 is used, it is possible to prevent deposition from depositing at the through holes in the heat exchange section 200 by supplying the synthetic fuel on the downstream side of the heat exchange section 200. Even in the cross-flow type heat exchanger, gas leakage occurs from bonded surfaces between heat transferring members such as a fin or a tube. However, by supplying the reforming fuel on the downstream side of the heat exchange section 200, it is possible to prevent unreacted reforming fuel from exhausting to the outside. In addition, it is possible to obtain the same effect by using a counter-current type heat exchanger, for example.

In each of the above-described embodiments, the temperature sensor 41 is provided in the reforming section 30. Alternatively, the temperature sensor may be disposed between the heat exchange section 20 (or 200) and the reforming section 30 in the low temperature fluid passage A, or on the downstream side of the reforming section 30, so that a temperature of a reforming catalyst is detected indirectly by detecting a temperature of the gas flowing in the low temperature fluid passage.

(Fifth Embodiment)

Figure 16:
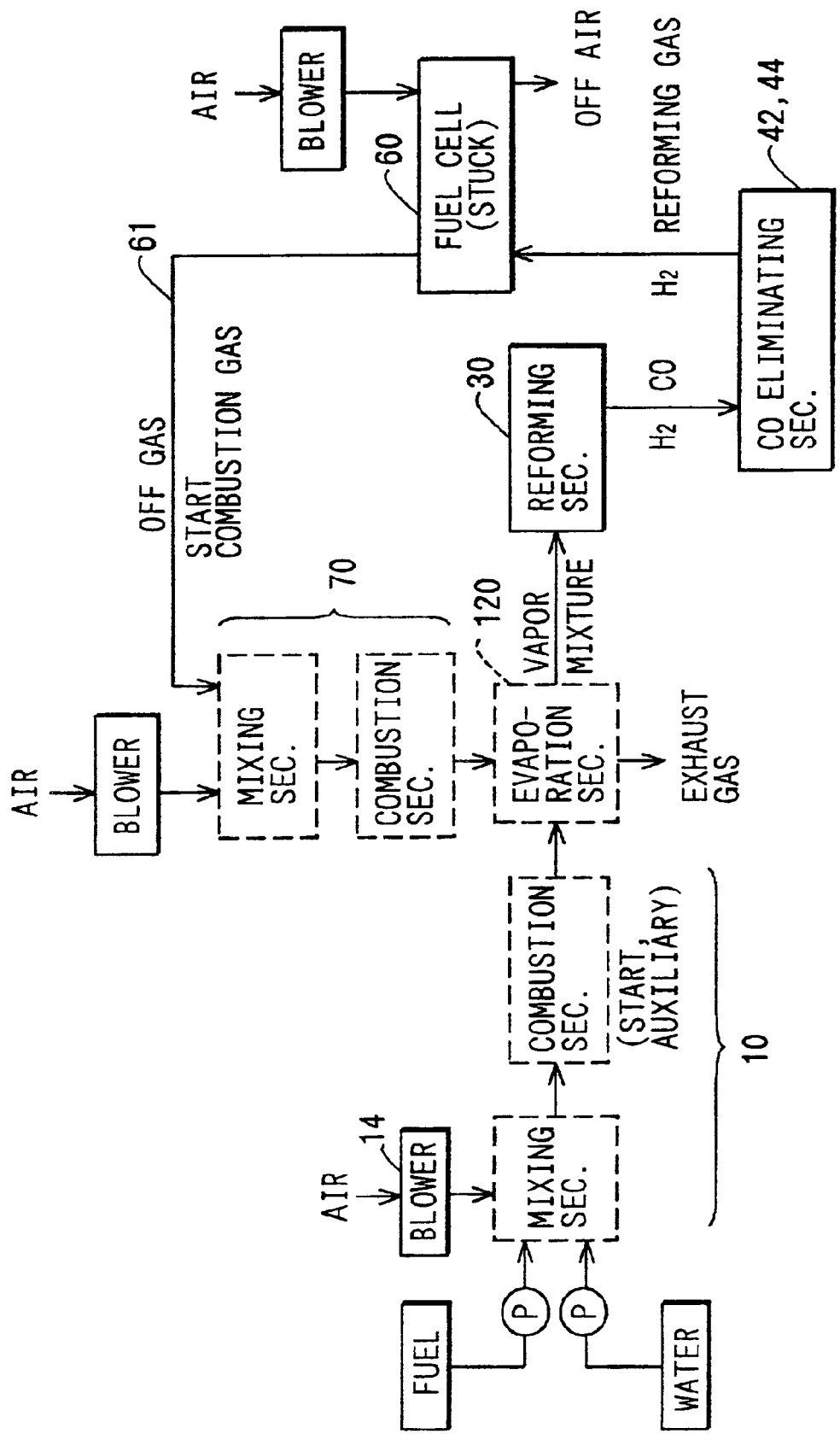
FIG. 16 is a block diagram illustrating a general structure of a hydrogen supply device according to fifth embodiment of the present invention.
Figure 17:
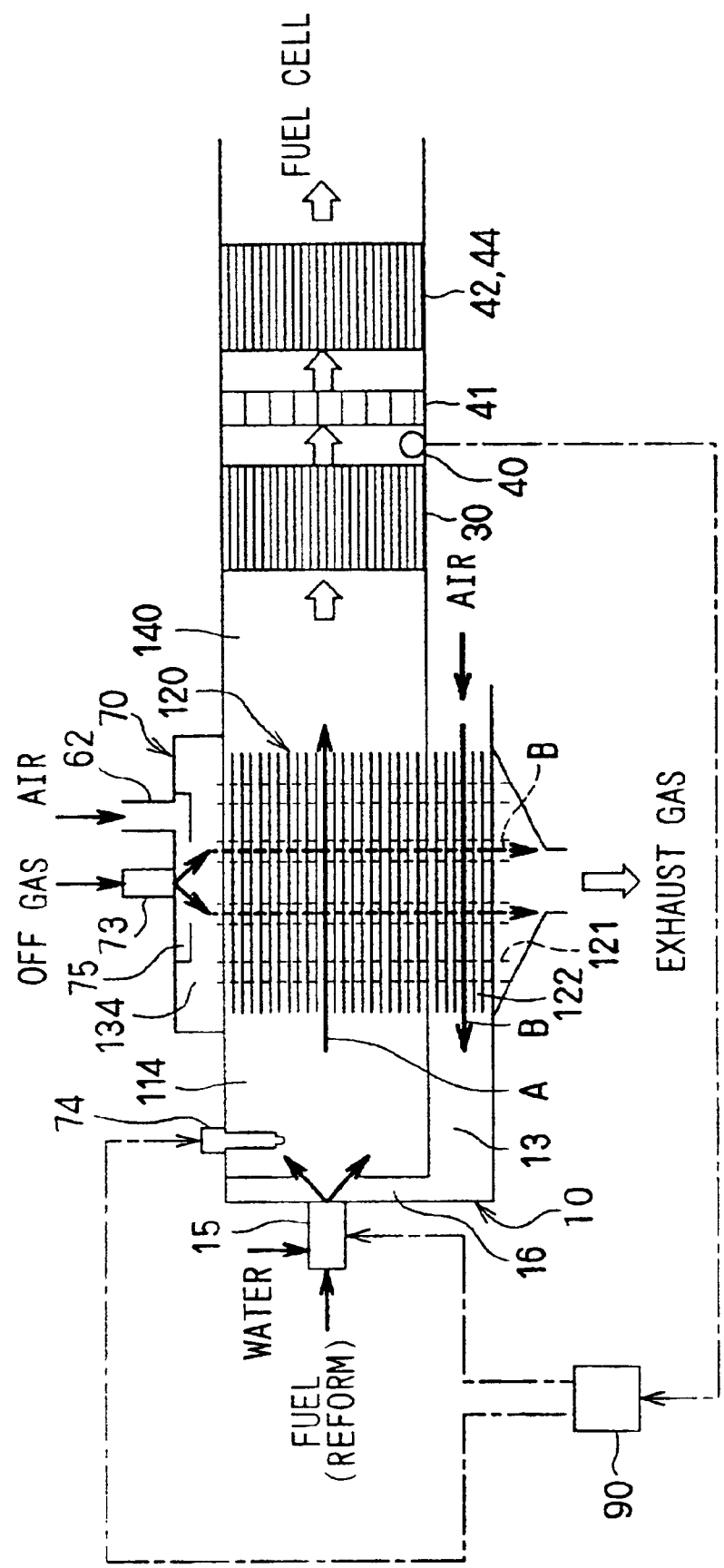
FIG. 17 is a conceptual diagram illustrating an arrangement of components of the hydrogen generation device of FIG. 16.

Referring to FIGS. 16 to 19B, fifth embodiment of the present invention will be described. FIG. 16 is a block diagram illustrating a general structure of a hydrogen supply device according to fifth embodiment. FIG. 17 is a conceptual diagram illustrating an arrangement of components of the hydrogen generation device.

As shown in FIGS. 16 and 17, the hydrogen generation device according to fifth embodiment includes a reforming material supply section 10, a heat exchange section (evaporation section) 120, an off gas supply section 70, a reforming section 30, and CO eliminating sections 42 and 44. The reforming material (a mixture of water, air and a carbon hydride compound as a reforming fuel) generated in the reforming material supply section 10 is heated and evaporated at the heat exchange section 120. The evaporated reforming material is reformed in the reforming section 30 to reformed gas containing $H_2$ and CO. After CO is eliminated at the CO eliminating sections 42 and 44, it is supplied as hydrogen rich gas to the fuel cell 60.

The reforming material supply section 10 includes an air passage 13 for introducing the air for reforming from outside, a spray nozzle 15 for spraying water and fuel for reforming, a reforming material mixing section 16, and an actuation combustion chamber 114. The reforming air introduced from the air passage 13 is mixed in the mixing section 16 with water and the reforming fuel sprayed from the spray nozzle 15, thus promoting atomization and mixture due to airflow interference. The fuel-air mixture (reforming material) generated in the mixing section 16 is diffused in the actuation combustion chamber 114 so as to be supplied to the heat exchanger 120 on the downstream side. The reforming material supply section 10 has a structure in which a mixture ratio of the reforming fuel and the reforming air can be adjusted.

The reforming fuel is supplied at a room temperature, while water is supplied at a temperature between the room temperature to 100° C. The reforming air is supplied after heated to about 400° C. at the heat exchanger 120 as described below.

The actuation combustion chamber 114 is provided with the ignition plug (igniting means) 74 for initiating flame combustion of a fuel-air mixture (the mixture of the reforming fuel and the air) generated in the mixing section 16 at the time of actuation (especially during a cold period). The combustion flame by the ignition plug 74 is held in the actuation combustion chamber 114. As such, the carbon hydride compound is used as the reforming fuel as well as the combustion fuel at the time of actuation. The combustion gas generated in the combustion chamber 114 is introduced into an off gas passage B of the heat exchanger 20 through the off gas introducing channel 61 after passing the reforming section 30. Accordingly, the off gas introducing channel 61 is used as a combustion gas introducing channel for introducing the combustion gas into the off gas introducing channel of the heat exchanger 20.

Figure 18:
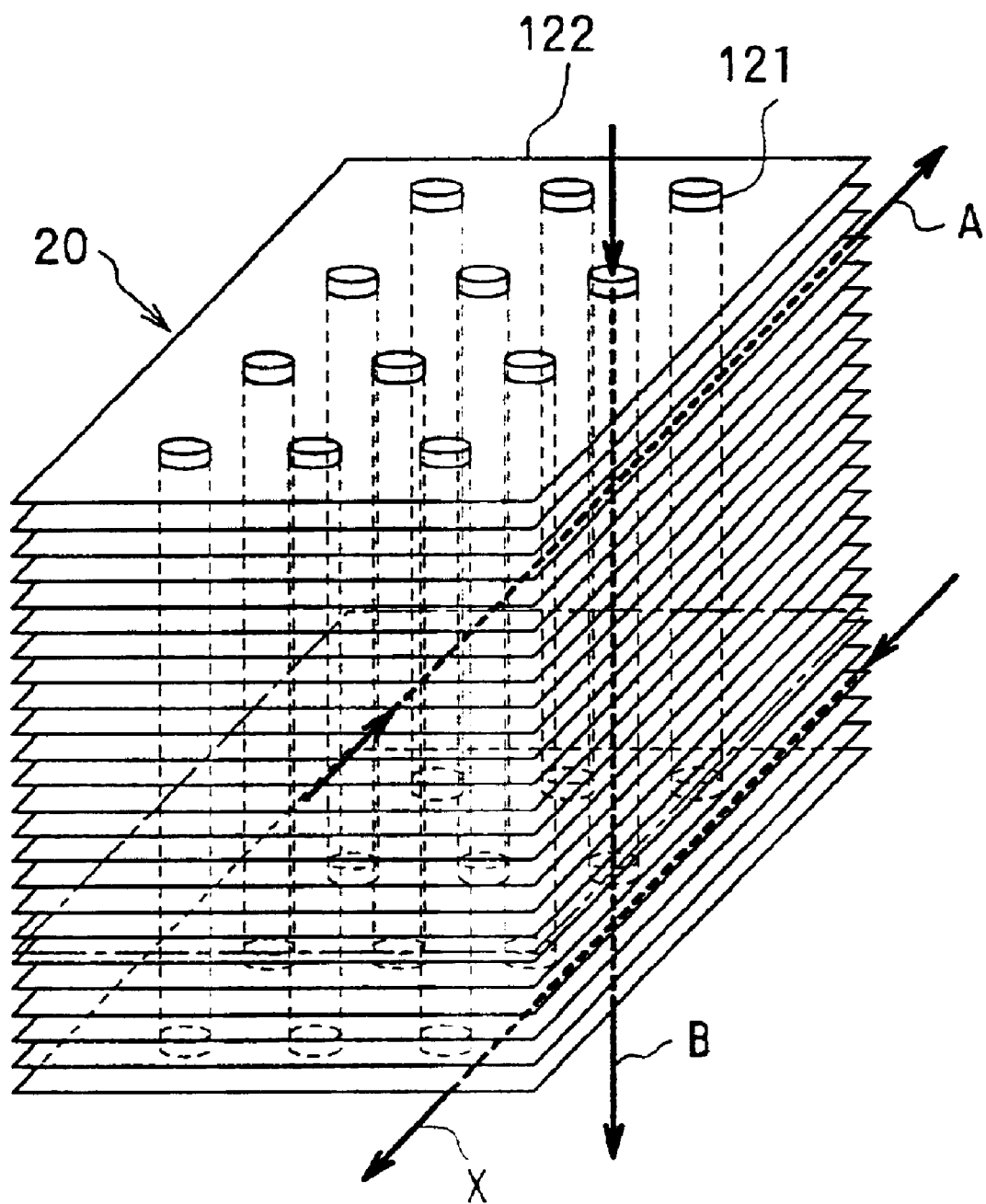
FIG. 18 is a perspective view of the heat exchanger of FIG. 17.

FIG. 18 is a perspective view of the heat exchanger 120. As shown in FIG. 18, the heat exchanger 120 is a cross-flow type heat exchanger constituted of a tube 121 and a heat transferring fin 122. The heat exchanger 20 includes: a reforming air passage X for passing the reforming air flowing in the air passage 13 of the above-described reforming material supply section 10; a reforming material passage A for passing the reforming material supplied from the reforming material supply section 10; and an off gas passage B for passing the off gas refluxing from the fuel cell 60. The reforming air passage X and the reforming material passage A are formed between the fins 122. The off gas passage B is formed within the tube 121. The reforming air passage X and the reforming material passage A cross the off gas passage B perpendicularly. With the above-described structure, heat can be exchanged between the reforming air passage X and the off gas passage B, and the reforming material passage A and the off gas passage B through a barrier of the heat exchanger 120.

Figure 19A:
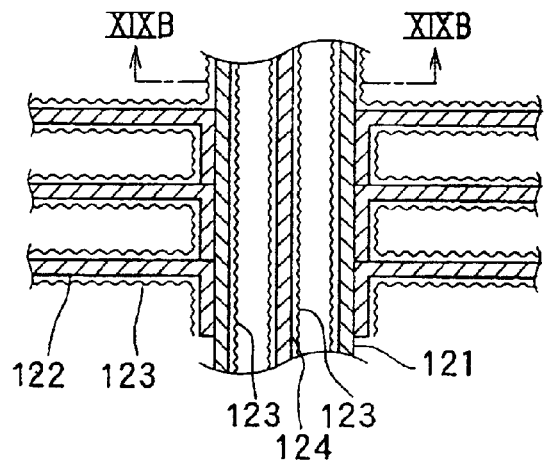
FIG. 19A is an enlarged cross-sectional view of an interface portion of the tube and the fin of the heat exchanger of FIG. 18.
Figure 19B:
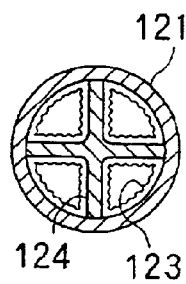
FIG. 19B is a cross-sectional view taken along XIXB—XIXB of FIG. 19A.

FIG. 19A is an enlarged cross-sectional view of an interface portion of the tube 121 and the fin 122 of the heat exchanger 20. FIG. 19B is a cross-sectional view taken along XIX—XIX of FIG. 19A. As shown in FIG. 19A, on each surface of the tube 121 and the fin 122, an oxidation catalyst is affixed, the oxidation catalyst being composed of noble metal catalysts such as Pt, Pd, Rh or the like. As shown in FIG. 19B, inside the tube 121, the inner fin 124 having the oxidation catalyst affixed thereon is provided, thus enhancing the heat exchange efficiency.

As shown in FIG. 17, on an inlet side of the off gas passage B (tube 121) in the heat exchanger 120, an off gas supply section 70 is provided to supply the refluxing off gas from the fuel cell 60 to the off gas passage B after mixing with the air. The off gas supply section 70 is constituted of: an air introducing tube 62 for introducing the air from outside; an off gas/air mixing chamber 75 for generating an off gas mixture by mixing the off gas and the air; an off gas injection valve 75 for injecting the off gas refluxing from the fuel cell 60; and a mixture gas diffusion chamber 134 for diffusing the off gas mixture.

When passing though the tube 121 of the heat exchanger 120, the off gas mixture generated in the off gas supply section 70 is combusted catalytically and flamelessly on a surface of the catalyst 123 affixed on a surface of the inner fin 124 and the inner surface of the tube 121. The combustion heat caused the off gas passage B temperature to be elevated to about 1000° C., thus transferring the heat to the reforming air passing though the reforming air passage X and the reforming material passing through the reforming material passage A.

On the downstream side the heat exchanger 120, the reforming section 30 having the reforming catalyst is provided. The reforming material evaporated at the heat exchanger 120 is supplied to the reforming section 30 through a heat exchanger downstream side passage 140. The reforming section 30 is a partial oxidization reformer for performing partial oxidation (exothermal reaction) to the reforming material evaporated in the heat exchanger 120 so as to conduct evaporation reforming (endothermic reaction) by the generated heat. As a result of the reforming reaction, the reforming section 30 generates a reformed gas containing $H_2$ and CO. When liquid petroleum type fuel is used as a reforming carbon hydride compound as in fifth embodiment, it is necessary for a temperature of the reforming section 30 to be about 700° C. to maintain the reforming reaction stably.

On the downstream side of the reforming section 30, a temperature sensor 40 is provided for detecting a temperature of the reforming section 30 by detecting a temperature of the reformed gas flowing out from the reforming section 30. On the downstream side of the temperature sensor 40, there is provided a cooling section 41 for cooling down the temperature of the reformed gas to a temperature necessary for CO elimination, and CO eliminating sections 42 and 44 for generating hydrogen rich gas by eliminating CO from the reformed gas cooled in the cooling section 41.

The hydrogen generation device of fifth embodiment is provided with a controlling section 90 for conducting various control. A temperature signal detected by the temperature sensor 40 is input to the controlling section 90 so as to conduct ignition control of the ignition plug 74 and a control of a supply amount of the reforming fuel by the spray nozzle 15.

An activation of the hydrogen generation device having the above-described structure will be described below. First, actuation of the hydrogen generation device will be described. In order to start a reforming reaction in the reforming section 30, it is necessary that the reforming material supplied to the reforming section 30 is evaporated, and that a temperature of the reforming catalyst of the reforming section 30 is elevated to a predetermined temperature so as to be able to start the reforming reaction.

Accordingly, in the reforming material supply section 10, a fuel-air mixture of the reforming fuel and the air is generated in the reforming material mixing section 16. Then, in the actuation combustion chamber 114, the fuel-air mixture is ignited by the ignition plug 74 for flame combustion. The combustion gas generated by the flame combustion flows through the reforming fuel channel A of the heat exchanger 120 so as to reach the reforming section 30, the cooling section 41, the CO eliminating section 42 and 44, and the fuel cell 60. Thereafter, it passes through the off gas passage B of the heat exchanger 120 through the off gas introducing channel 61 so as to rapidly warm up each component of the hydrogen generation device before being discharged in the atmosphere.

At that time, the combustion gas contains harmful gas due to incomplete combustion or the like. However, when the combustion gas passes through the heat exchanger 120, the gas is catalytically combusted by the catalyst 123 affixed on the fin 122, the tube 121 and the inner fin 124 (i.e., a catalytic oxidization reaction has occurred). Thus, by adjusting a mixture ratio of the reforming fuel and the air appropriately, and by making complete oxidization reaction (complete combustion) to the combustion gas along with the catalytic oxidization reaction in the heat exchanger 120, the harmful gas contained in the combustion gas is sufficiently clarified.

The combustion heat of the combustion gas rapidly warms up (i.e., pre-heats) each component of the reforming system such as the heat exchanger 120, the reforming section 30, and the reforming catalyst (the reforming section, the shift section and the purifying section). Then, when a temperature detected by the temperature sensor 40 reaches to a predetermined temperature, components of the reforming system identifies that the temperature has reached to the point where the reforming reaction can be initiated. Accordingly, supply of the fuel is temporary stopped to terminate the flame combustion.

When warming up of each component is completed, the reforming air, which is heated after passing through the reforming air passage X of the heat exchanger 120, is mixed in the mixing section 16 with the reforming fuel and water so as to generate a fuel-air mixture (the reforming material). At that time, the reforming air is pre-heated before being mixed with the reforming fuel by passing through the reforming air passage X of the heat exchanger 120, evaporation of the reforming material can be promoted.

The reforming material generated in the reforming material supply section 10 is supplied to the heat exchanger 120, and heated and evaporated as it passes through the reforming material passage A. The reforming material evaporated in the heat exchanger 20 is reformed in the reforming section 30 to be reformed gas containing $H_2$ and CO. After cooled down at the cooling section 41, CO is eliminated at the CO eliminating sections 42 and 44 to generate hydrogen rich gas to be supplied to the fuel cell 60.

In the fuel cell 60, a chemical reaction occurs between hydrogen and oxygen to generate power, and the off gas containing unreacted hydrogen is emitted. The off gas is introduced into the off gas supply section 70 through the off gas introducing channel 61. The off gas is mixed with a predetermined amount of the air to become the off gas mixture that is supplied to the off gas passage B of the heat exchanger 20. The off gas mixture initiates the catalytic combustion as it passes through the off gas passage B. The heat generated by catalytic combustion of the off gas transferred to the reforming material passing through the reforming material passage A and the reforming air passing through the reforming air passage X through the barrier of the heat exchanger 20. Accordingly, heating and evaporation of the reforming material is promoted.

As such, the heat generated by the catalytic combustion of the off gas heats up the reforming material for evaporation, and the reforming section on the downstream side may be heated through the heated reforming material. Accordingly, heating of the heat exchange section 20 and the reforming section 30 is switched from heating by the flame combustion of the actuation fuel to heating by the off gas combustion, thus enabling to start self-driving of the hydrogen supply device.

According to the hydrogen generation device of fifth embodiment, the reforming fuel generated the actuation fuel gas by the flam combustion, and the combustion heat thereof directly heats up each component of the reforming system (the heat exchanger 120 and the reforming section 30). Therefore, it is possible to rapidly elevate a temperature to the reforming reaction initiating temperature. Thereby, it is possible to reduce an actuation time until the reforming reaction initiation. Accordingly, because the reforming reaction temperature is high (at about 700° C.) in the hydrogen generation device of fifth embodiment, it can preferably be used in a case where petroleum type fuel such as gasoline, kerosene or the like is used, in which rapid elevation of the temperature is particularly important at a time of actuation.

Moreover, because the heat exchanger 120 according to fifth embodiment has a function to preheat the reforming air as well as a function to evaporate the reforming material, downsizing of the hydrogen generation device as a whole can be realized.

By forming a catalytic reaction section (combustion section) on the heat transfer surfaces of the barrier of the heat exchanger 120 (the reforming material passage A and the off gas passage B) by attaching an oxidization catalyst, the whole system can be downsized as well as lowered its emission.

The heating value associated with the off gas combustion process within the heat exchanger 120 is recovered as heating/evaporation of the reforming material and a concurrent heating value of the endothermic reaction (vapor reforming reaction) in the reforming section 30, thus achieving high-efficiency.

Moreover, on the reforming material side of the heat exchanger 120, rapid complete combustion is possible by using the complete oxidization reaction (flame combustion) at the time of actuation. When the reforming is activated, a reaction ratio of a partial oxidization reaction of the reforming material at the time of reforming activation can follow by adjusting the mixture ratio of the reforming air and the reforming fuel even the load fluctuation occurs rapidly.

Furthermore, by sharing the supply mixing section of the reforming material (the fuel for reforming, water and air) with the combustion mixing chamber upon actuation, the whole device can be downsized.

(Sixth Embodiment)

Next, referring to FIGS. 20 to 23B, sixth embodiment according to the present invention will be described. A hydrogen generation device according to sixth embodiment has a heat exchanger having a different structure when compared to the above-described fifth embodiment. Members similar to the above-described fifth embodiment will be denoted by the same reference numerals, and description thereof will be omitted.

Figure 20:
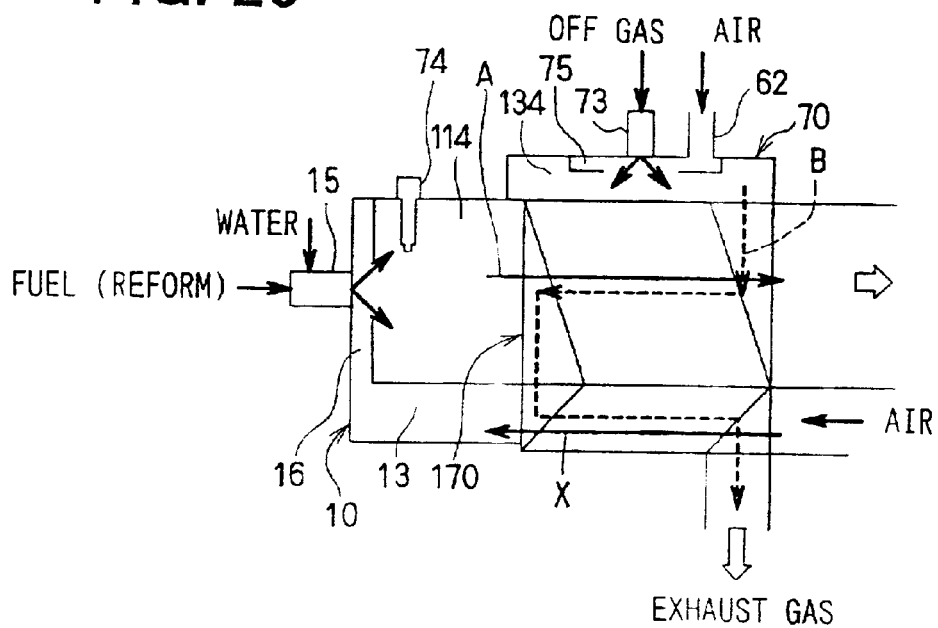
FIG. 20 is a conceptual view illustrating a reforming material supply section and a heat exchanger of a hydrogen generation device according to sixth embodiment of the present invention.
Figure 21:
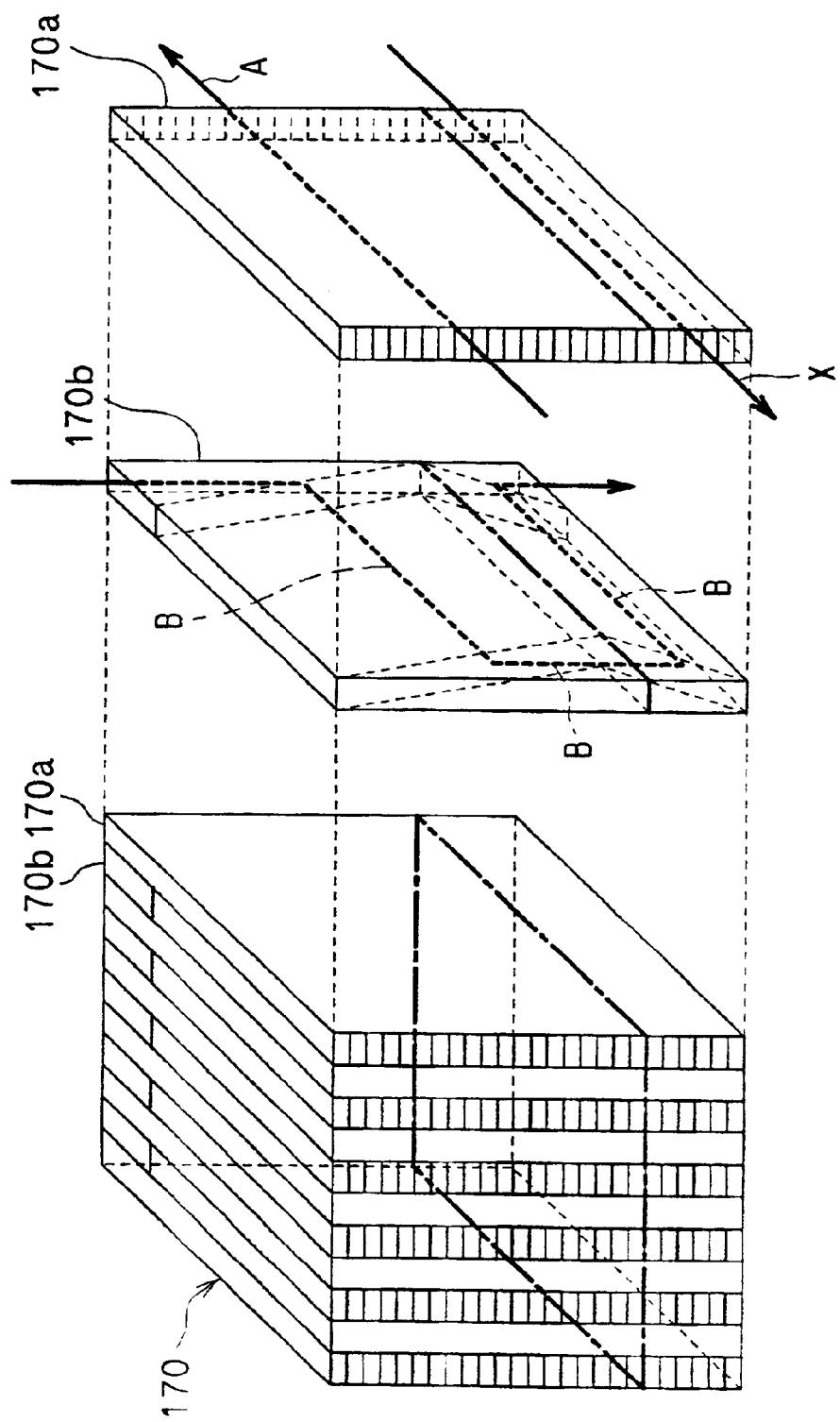
FIG. 21 is a perspective view solely illustrating the heat exchanger according to the sixth embodiment.
Figure 22:
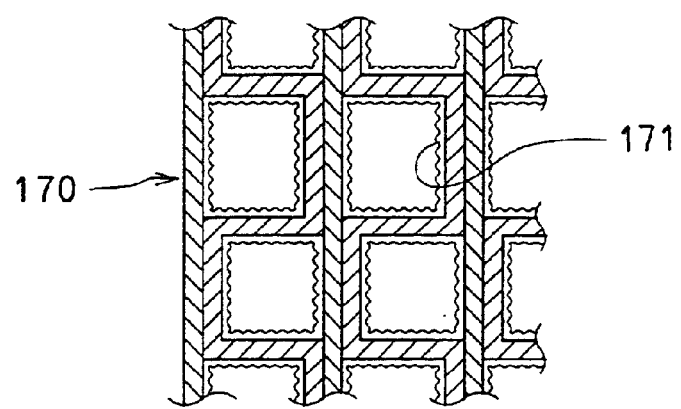
FIG. 22 is a partly enlarged view of the heat exchanger of FIG. 21.

FIG. 20 is a conceptual view illustrating a reforming material supply section 10 and a heat exchanger 170 of the hydrogen generation device. FIG. 21 is a perspective view solely illustrating the heat exchanger 170 according to sixth embodiment. As shown in FIGS. 20 and 21, the heat exchanger 170 used in the hydrogen generation device according to sixth embodiment is a counter current type heat exchanger, in which a reform air channel X and an off gas passage B, and a reforming material passage A and an off gas passage B are formed so as to oppose each other. Each channel has a heat transfer surface of a plate fin formed therein as shown in FIG. 22, and an oxidization catalyst 171 is attached on a fin surface.

The heat exchanger 170 has a structure in which a first heat exchange chamber 170a forming the reforming air passage X and the reforming material passage A, and a second heat exchange chamber 170b forming the off gas passage B are formed alternately and sequentially.

Figure 23A:
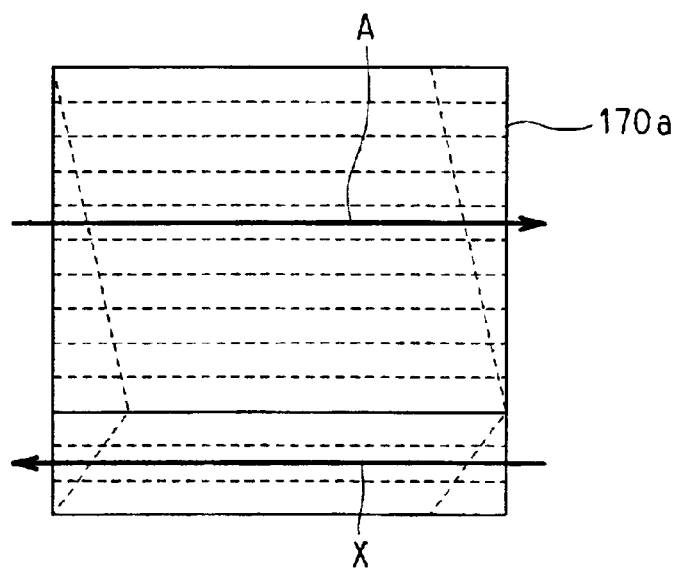
FIG. 23A is a cross-sectional view of a first heat exchange chamber composing the heat exchanger of FIG. 21.
Figure 23B:
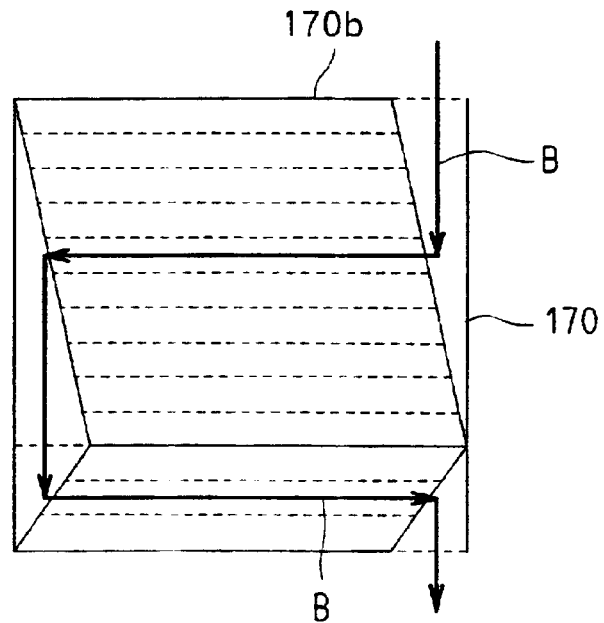
FIG. 23B is a cross-sectional view of a second heat exchange chamber composing the heat exchanger of FIG. 21.

FIG. 23A is a cross-sectional view of the first heat exchange chamber 170a composing the heat exchanger 170. FIG. 23B is a cross-sectional view of the second heat exchange chamber 170b. As shown in FIG. 23A, the reforming air passes through the heat exchanger 170 in a direction from the right to the left in the Figure, while the reforming material passes through from the left to the right in the Figure. Moreover, as shown in FIG. 23B, the off gas enters into the heat exchanger 170 from the upper side in the Figure, passes through in the direction from the right to the left in the Figure, and proceed to below so as to pass through from the left to the right direction in the Figure. Thereafter, the off gas is emitted from the lower portion of the heat exchanger 170. The off gas is catalytically combusted within the off gas passage B. The combustion heat of the off gas is transferred to the reforming air and the reforming material through the barrier.

As such, by using the counter current type heat exchanger as in the hydrogen generation device of sixth embodiment, it is possible to enhance heat exchange efficiency of the heat exchanger, and to downsize the device.

(Seventh Embodiment)

Figure 24:
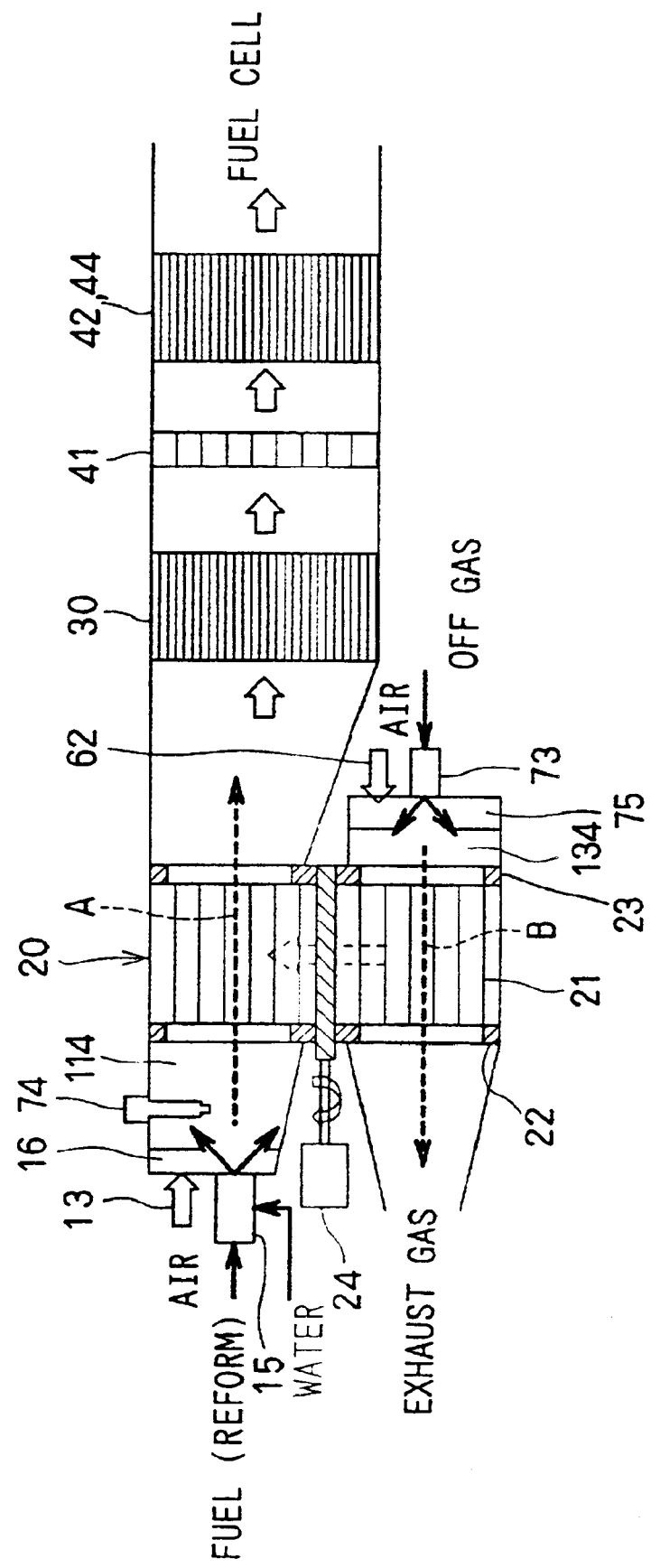
FIG. 24 is a conceptual view illustrating a reforming material supply section and a heat exchanger of a hydrogen generation device according to seventh embodiment of the present invention.

Referring now to FIG. 24, seventh embodiment of the present invention will be described. A hydrogen generation device according to seventh embodiment has a heat exchanger having a different structure when compared to the above-described fifth embodiment. Members similar to the above-described sixth embodiment will be denoted by the same reference numerals, and description thereof is omitted.

FIG. 24 is a conceptual view illustrating a reforming material supply section 10 and a heat exchanger 20 of the hydrogen generation device.

As shown in FIG. 24, the heat exchanger 20 includes a rotary thermal storage (heat exchange section 21) and the gas seals 22 and 23, i.e., it is the same as what is described in the above-described first embodiment.

When the hydrogen generation device is actuated, heat capacity of the heat storage is reduced as rotation of the rotary thermal storage 21 is stopped, thus enabling to complete warming up in a short period of time.

Figure 25:
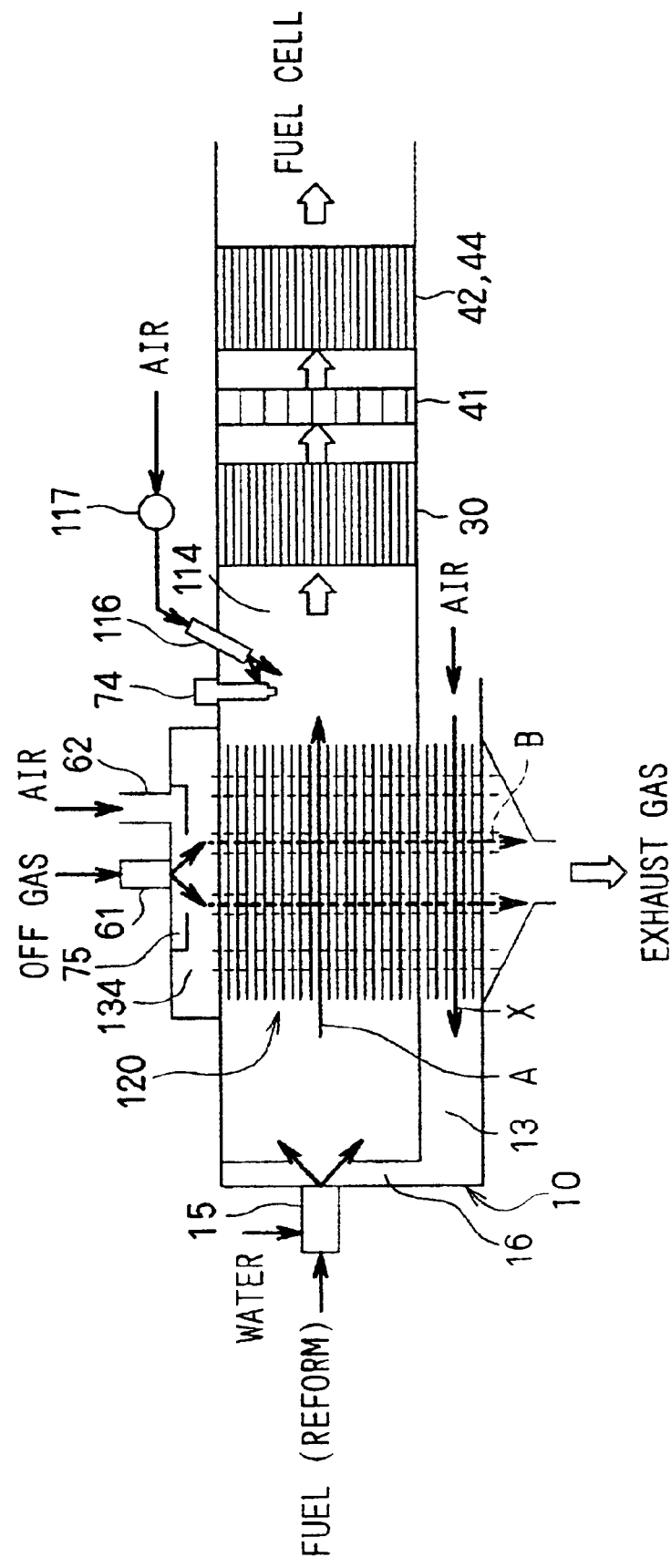
FIG. 25 is a conceptual view illustrating a reforming material supply section and a heat exchanger of a hydrogen generation device according to a modification of the fifth embodiment.

In the above-described fifth embodiment, the combustion chamber 114 for the flame combustion of the reforming material ignited by the ignition plug 74 is disposed on the upstream side of the heat exchanger 120. Alternatively, it may be disposed between the heat exchanger 120 and the reforming section 30 as shown in FIG. 25. The hydrogen generation device as shown in FIG. 25 includes an air nozzle 116 for supplying the air to the combustion chamber 114. The amount of the air supplied from the air nozzle is controlled by the flow rate control valve 117.

Figure 26:
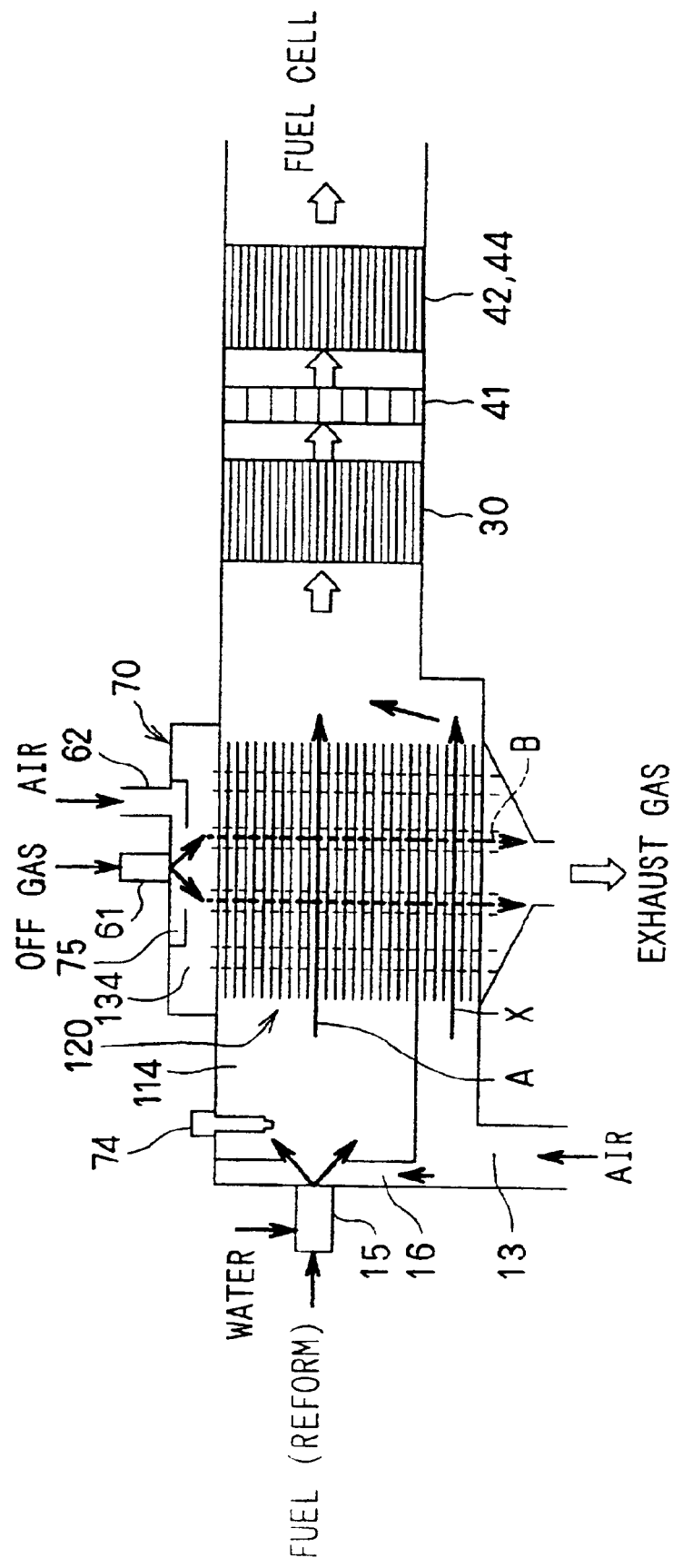
FIG. 26 is a conceptual view illustrating a reforming material supply section and a heat exchanger of a hydrogen generation device according to another modification of the fifth embodiment.

In the above-described fifth embodiment, all of the reforming air is supplied to the mixing section 16. Alternatively, as shown in FIG. 26, a part of the reforming air may be supplied between the heat exchanger 120 and the reforming section 30 after passing through the heat exchanger 120. With such a structure, oxygen amount supplied to the reforming section 30 increases, thus speeding up the heating of the reforming section 30 due to the oxidization catalytic reaction, which is the exothermal reaction.

Moreover, in the above-described fifth embodiment, the actuation fuel gas is supplied from the reforming section 30 to the fuel cell 60 before supplying to the heat exchanger 120 through the off gas introducing channel 61. Alternatively, a channel for by-passing the fuel cell 60 may be provided so that the combustion gas by-passes the fuel cell 60.

In each of the above-described embodiments, a liquid petroleum type fuel such as gasoline, kerosene or the like is used as the reforming fuel. Alternatively, various kinds of carbon hydride compounds such as methanol, natural gas or the like may be used. Moreover, hydrogen compounds having no carbon contained therein such as ammonia, for example, may be used.

Furthermore, in the above-described fifth embodiment, a cross-flow type heat exchanger is used while a counter-current type heat exchanger is used in the above-described sixth embodiment. Alternatively, a heat exchanger using a cross-flow type in conjunction with a counter-current type may be used.

What is claimed is:

1. A hydrogen supply device for producing and supplying hydrogen to a hydrogen consumption device, comprising:

a low temperature fluid passage;

a high temperature fluid passage;

a heat exchange section having a rotary thermal storage through which the low and high temperature passages pass, the rotary thermal storage being driven to rotate;

a reforming material supply section for supplying at least a part of reforming material to the low temperature fluid passage on an upstream side of the heat exchange section;

a reforming section in which the reforming material is reformed to a reformed gas containing hydrogen after passing through the low temperature fluid passage; and a combustion gas supply section for generating and supplying a combustion gas to the high temperature fluid passage, wherein the rotary thermal storage rotates to move alternately between the low and high temperature fluid passages so that combustion heat of the combustion gas flowing in the high temperature fluid passage is transferred to the reforming material flowing in the low temperature fluid passage; and wherein the hydrogen supply device further comprises:

a communicating passage through which the low temperature fluid passage communicates with the high temperature fluid passage; and pressurizing means located at any one position among the low temperature fluid passage on a downstream side of the heat exchange section, the communicating passage and the high temperature fluid passage on an upstream side of the heat exchange section, to increase pressure of gas flowing in the temperature fluid passage.

2. A hydrogen supply device according to claim 1, further comprising:

pressure adjusting means located at least at one of two passages consisting of the low temperature fluid passage on an upstream side of the heat exchange section and the high temperature fluid passage on a downstream side of the heat exchange section.

3. A hydrogen supply device according to claim 2, wherein the pressure adjusting means is a pressure control valve that is operative to alter a fluid flow passage area.

4. A hydrogen supply device according to claim 3, further comprising:

first pressure detecting means for detecting pressure of the low temperature fluid passage in a vicinity of the rotary thermal storage;

second pressure detecting means for detecting pressure of the high temperature fluid passage in a vicinity of the rotary thermal storage; and control means for controlling an opening degree of the pressure control valve according to the pressures of the low and high temperature fluid passages detected respectively by the first and second pressure detecting means.

5. A hydrogen supply device according to claim 4, wherein the control means controls the opening degree of the pressure control valve so that the pressure of the high temperature fluid passage is isobaric to or higher than the pressure of the low temperature fluid passage.

6. A hydrogen supply device according to claim 1, wherein the hydrogen consumption device is a fuel cell.

7. A hydrogen supply device according to claim 1, wherein the reforming material comprises a first reforming material containing at least water and second reforming material containing at least hydride compound, and, further wherein the reforming material supply section comprises a first reforming material supply section in which the first reforming material is supplied to the low temperature fluid passage on an upstream side of the heat exchange section and a second reforming material supply section in which the second reforming material is supplied to the low temperature fluid passage on a downstream side of the heat exchange section and mixed with the first reforming material to form the reforming material.

8. A hydrogen supply device according to claim 7, wherein the second reforming material supply section is provided with a mixing chamber in which the first and second reforming material are mixed.

9. A hydrogen supply device according to claim 1, further comprising:

an off gas supply path through which off gas containing unreacted hydrogen that is not sufficiently consumed in the hydrogen consumption device is supplied from the hydrogen consumption device to the combustion gas supply section for producing the combustion gas.

10. A hydrogen supply device according to claim 1, further comprising:

a combustion fuel supply section provided in the combustion gas supply section for supplying fuel to be combusted; and igniting means provided in the combustion gas supply section for igniting the fuel to produce the combustion gas.

11. A hydrogen supply device according to claim 1, further comprising:

an oxidation catalyst affixed to a surface of the rotary thermal storage that comes in contact with the combustion gas flowing in the high temperature fluid passage and reformed gas flowing in the low temperature fluid passage.

12. A hydrogen supply device according to claim 1, wherein the rotary thermal storage is provided with a matrix having a plurality of through-holes extending axially and a housing in which the matrix is rotatingly housed, each of opposite axial end of the housing having a first region communicating with the high temperature fluid passage and a second region communicating with the low temperature fluid passage so that the combustion gas flowing in the high temperature fluid passage passes through the through-holes whose opening ends face to the first region and the reforming material flowing in the low temperature fluid passage passes through the through-holes whose opening ends face to the second region.

13. A hydrogen supply device according to claim 1, further comprising:

an actuation combustion chamber provided in the low temperature fluid passage on an upstream side of the heat exchange section, actuation fuel containing at least hydride compounds being supplied to the actuation combustion chamber; and igniting means provided in the actuation combustion chamber for initiating flame combustion of the actuation fuel supplied to the actuation combustion chamber at a time of actuation of hydrogen supply device, wherein combustion gas due to the flame combustion passes through the heat exchange section and the reforming section to the combustion gas supply section so that the heat exchange section and the reforming section are heated up more rapidly.

14. A hydrogen supply device according to claim 13, wherein the actuation fuel and the reforming material for producing the reformed gas containing hydrogen are the same material.

15. A hydrogen supply device according to claim 1, further comprising:
an actuation combustion chamber provided in the low temperature fluid passage between the heat exchange section and the reforming section, actuation fuel containing at least hydride compounds being supplied to the actuation combustion chamber; and
igniting means provided in the actuation combustion chamber for initiating flame combustion of the actuation fuel supplied to the actuation combustion chamber at a time of actuation of hydrogen supply device,
wherein combustion gas due to the flame combustion passes through the reforming section to the combustion gas supply section so that the reforming section are heated up more rapidly.

16. A hydrogen supply device according to claim 15, wherein the actuation fuel and the reforming material for producing the reformed gas containing hydrogen are the same material.

17. A hydrogen supply device according to claim 1, further comprising:
an actuation combustion chamber provided in the low temperature fluid passage between the heat exchange section and the reforming section, the reforming fuel containing at least hydride compounds and air being supplied to the reforming material supply section and another air being supplied to the actuation combustion chamber; and
igniting means provided in the actuation combustion chamber for initiating flame combustion of the reforming material at a time of actuation of hydrogen supply device,
wherein combustion gas due to the flame combustion passes through the reforming section to the combustion gas supply section so that the reforming section are heated up more rapidly.

18. A hydrogen supply device for producing and supplying hydrogen to a hydrogen consumption device, comprising;
a low temperature fluid passage;
a high temperature fluid passage;
a heat exchange section having a rotary thermal storage through which the low and high temperature passages pass, the rotary thermal storage being driven to rotate;
a reforming material supply section for supplying at least a part of reforming material to the low temperature fluid passage on an upstream side of the heat exchange section;
a reforming section in which the reforming material is reformed to a reformed gas containing hydrogen after passing through the low temperature fluid passage; and
a combustion gas supply section for generating and supplying a combustion gas to the high temperature fluid passage,
wherein the rotary thermal storage rotates to move alternately between the low and high temperature fluid passages so that combustion heat of the combustion gas flowing in the high temperature fluid passage is transferred to the reforming material flowing in the low temperature fluid passage,
wherein the hydrogen supply device further comprises:
pressurizing means for increasing pressure of the combustion gas flowing in the high temperature fluid passage; and
a communicating passage through which the low temperature fluid passage communicates with the high temperature fluid passage,
wherein the pressurizing means is a gas compressor located at any one position among the low temperature fluid passage on a downstream side of the heat exchange section, the communicating passage and the high temperature fluid passage on an upstream side of the heat exchange section.

19. A hydrogen supply device according to claim 18, wherein the communicating passage comprises a reformed gas supply path through which the reformed gas containing hydrogen is supplied from the reforming section to the hydrogen consumption device and an off gas supply path through which off gas containing unreacted hydrogen that is not sufficiently consumed in the hydrogen consumption device is supplied from the hydrogen consumption device to the combustion gas supply section for producing the combustion gas and, further, wherein the gas compressor is located in the reformed gas supply path.

20. A hydrogen supply device according to claim 18, further comprising:
pressure adjusting means located at least at one of two passages consisting of the low temperature fluid passage on an upstream side of the heat exchange section and the high temperature fluid passage on a downstream side of the heat exchange section.

21. A hydrogen supply device according to claim 18, wherein the hydrogen consumption device is a fuel cell.

22. A hydrogen supply device according to claim 18, further comprising:
an off gas supply path through which off gas containing unreacted hydrogen that is not sufficiently consumed in the hydrogen consumption device is supplied from the hydrogen consumption device to the combustion gas supply section for producing the combustion gas.

23. A hydrogen supply device according to claim 18, further comprising:
a combustion fuel supply section provided in the combustion gas supply section for supplying fuel to be combusted; and
igniting means provided in the combustion gas supply section for igniting the fuel to produce the combustion gas.

24. A hydrogen supply device according to claim 18, further comprising:
an oxidation catalyst affixed to a surface of the rotary thermal storage that comes in contact with the combustion gas flowing in the high temperature fluid passage and reformed gas flowing in the low temperature fluid passage.

25. A hydrogen supply device according to claim 18, wherein the rotary thermal storage is provided with a matrix having a plurality of through-holes extending axially and a housing in which the matrix is rotatingly housed, each of opposite axial end of the housing having a first region communicating with the high temperature fluid passage and a second region communicating with the low temperature fluid passage so that the combustion gas flowing in the high temperature fluid passage passes through the through-holes whose opening ends face to the first region and the reforming material flowing in the low temperature fluid passage passes through the through-holes whose opening ends face to the second region.

26. A hydrogen supply device according to claim 18, further comprising:

an actuation combustion chamber provided in the low temperature fluid passage on an upstream side of the heat exchange section, actuation fuel containing at least hydride compounds being supplied to the actuation combustion chamber; and igniting means provided in the actuation combustion chamber for initiating flame combustion of the actuation fuel supplied to the actuation combustion chamber at a time of actuation of hydrogen supply device, wherein combustion gas due to the flame combustion passes through the heat exchange section and the reforming section to the combustion gas supply section so that the heat exchange section and the reforming section are heated up more rapidly.

27. A hydrogen supply device according to claim 18, wherein the reforming material comprises a first reforming material containing at least water and second reforming material containing at least hydride compound, and, further wherein the reforming material supply section comprises a first reforming material supply section in which the first reforming material is supplied to the low temperature fluid passage on an upstream side of the heat exchange section and a second reforming material supply section in which the second reforming material is supplied to the low temperature fluid passage on a downstream side of the heat exchange section and mixed with the first reforming material to form the reforming material.

28. A hydrogen supply device according to claim 18, further comprising:

an actuation combustion chamber provided in the low temperature fluid passage between the heat exchange section and the reforming section, actuation fuel containing at least hydride compounds being supplied to the actuation combustion chamber; and igniting means provided in the actuation combustion chamber for initiating flame combustion of the actuation fuel supplied to the actuation combustion chamber at a time of actuation of hydrogen supply device, wherein combustion gas due to the flame combustion passes through the reforming section to the combustion gas supply section so that the reforming section are heated up more rapidly.

29. A hydrogen supply device according to claim 18, further comprising:

an actuation combustion chamber provided in the low temperature fluid passage between the heat exchange section and the reforming section, the reforming fuel containing at least hydride compounds and air being supplied to the reforming material supply section and another air being supplied to the actuation combustion chamber; and igniting means provided in the actuation combustion chamber for initiating flame combustion of the reforming material at a time of actuation of hydrogen supply device, wherein combustion gas due to the flame combustion passes through the reforming section to the combustion gas supply section so that the reforming section are heated up more rapidly.

30. A hydrogen supply device for producing and supplying hydrogen to a hydrogen consumption device, comprising:

a low temperature fluid passage;

a high temperature fluid passage;

a heat exchange section having a rotary thermal storage through which the low and high temperature passages pass, the rotary thermal storage being driven to rotate;

a reforming material supply section for supplying at least a part of reforming material to the low temperature fluid passage on an upstream side of the heat exchange section;

a reforming section in which the reforming material is reformed to a reformed gas containing hydrogen after passing through the low temperature fluid passage; and a combustion gas supply section for generating and supplying a combustion gas to the high temperature fluid passage, wherein the rotary thermal storage rotates to move alternately between the low and high temperature fluid passages so that combustion heat of the combustion gas flowing in the high temperature fluid passage is transferred to the reforming material flowing in the low temperature fluid passage, wherein the hydrogen supply device further comprises:

pressurizing means for increasing pressure of the combustion gas flowing in the high temperature fluid passage upstream of the rotary thermal storage, so that the pressure in the high temperature fluid passage becomes higher than that in the low temperature fluid passage.

* * * * *